US012702141B2

(12) United States Patent
Drachmann et al.

(10) Patent No.: US 12,702,141 B2
(45) Date of Patent: Aug. 11, 2026

(54) CHOLESTEROL-ENRICHED MILK LIPID COMPOSITION SUITABLE FOR INFANT NUTRITION, METHOD OF PRODUCTION, AND NUTRITIONAL COMPOSITIONS COMPRISING THE MILK LIPID COMPOSITION

(71) Applicant: ARLA FOODS AMBA, Viby J (DK)

(72) Inventors: Nikolaj Drachmann, Viby J (DK); Kristine Ingrid Marie Blans, Viby J (DK); Marie Ostenfeld, Viby J (DK); Hans Bertelsen, Viby J (DK); Kristian Raaby Poulsen, Viby J (DK)

(73) Assignee: ARLA FOODS AMBA, Viby J (DK)

(*) Notice: Subject to any disclaimer, the term of this patent is extended or adjusted under 35 U.S.C. 154(b) by 266 days.

(21) Appl. No.: 18/038,951

(22) PCT Filed: Nov. 29, 2021

(86) PCT No.: PCT/EP2021/083337
§ 371 (c)(1),
(2) Date: May 25, 2023

(87) PCT Pub. No.: WO2022/112552
PCT Pub. Date: Jun. 2, 2022

(65) Prior Publication Data

US 2024/0206488 A1 Jun. 27, 2024

(30) Foreign Application Priority Data

Nov. 27, 2020 (EP) .................................... 20210361

(51) Int. Cl.

*A23L 33/115* (2016.01)
*A23C 9/142* (2006.01)
*A23L 33/00* (2016.01)

(52) U.S. Cl.

CPC .......... *A23C 9/1425* (2013.01); *A23L 33/115* (2016.08); *A23L 33/40* (2016.08)

(58) Field of Classification Search

CPC ........ A23L 33/40; A23L 33/115; A23L 33/17; A23L 33/19; A23L 33/18; A23C 2240/05; A23C 9/1307; A23C 21/00; A23C 9/1425

(Continued)

(56) References Cited

U.S. PATENT DOCUMENTS 4,485,040 A * 11/1984 Roger .................... A23J 1/205 530/832
7,259,243 B2 8/2007 Sørensen et al.

(Continued)

FOREIGN PATENT DOCUMENTS

CN 102215702 A 10/2011
CN 106359604 A 2/2017

(Continued)

OTHER PUBLICATIONS

Clark, R. M. et al. Desmosterol in human milk. Lipids 1983, 18, 264-266.

(Continued)

*Primary Examiner* — Hong T Yoo
(74) *Attorney, Agent, or Firm* — Michael Best & Friedrich LLP

(57) ABSTRACT

The present invention pertains to methods of producing cholesterol-enriched milk lipid compositions suitable for infant nutrition by membrane-based fractionation of dairy based whey, to the cholesterol-enriched milk lipid compositions as such, and to their uses as food ingredients.

9 Claims, 1 Drawing Sheet

(58) Field of Classification Search
USPC .................................... 426/34, 33, 580, 801
See application file for complete search history.

(56) References Cited

U.S. PATENT DOCUMENTS

| | | | | |
|---|---|---|---|---|
| 10,258,064 | B2 | 4/2019 | Döring | |
| 2008/0171119 | A1 | 7/2008 | Bendixen et al. | |
| 2012/0100222 | A1 | 4/2012 | Goto et al. | |
| 2014/0106044 | A1 | 4/2014 | Lehmann | |
| 2014/0255537 | A1* | 9/2014 | Banavara | A23L 33/135 426/71 |
| 2016/0158287 | A1 | 6/2016 | Lönnerdal et al. | |
| 2017/0000182 | A1 | 1/2017 | Huber-haag et al. | |
| 2018/0343882 | A1 | 12/2018 | Reif et al. | |
| 2019/0388518 | A1 | 12/2019 | Belldegrun et al. | |

FOREIGN PATENT DOCUMENTS

| | | | |
|---|---|---|---|
| CN | 107259527 | A | 10/2017 |
| CN | 108522655 | A | 9/2018 |
| CN | 109043513 | A | 12/2018 |
| CN | 109788772 | A | 5/2019 |
| EP | 2452567 | A1 | 5/2012 |
| EP | 1901620 | B1 | 7/2020 |
| JP | H0530903 | A | 2/1993 |
| JP | 05-269353 | A | 10/1993 |
| JP | 05-292880 | A | 11/1993 |
| JP | 2005-336230 | A | 12/2005 |
| JP | 2006-158340 | A | 6/2006 |
| JP | 2007-89535 | A | 4/2007 |
| JP | 2014514929 | A | 6/2014 |
| JP | 2016-503660 | A | 2/2016 |
| UA | 58183 | U | 7/2010 |
| WO | 2006041316 | A1 | 4/2006 |
| WO | 2013137714 | A1 | 9/2013 |
| WO | 2017220697 | A1 | 12/2017 |
| WO | 2020002426 | A1 | 1/2020 |
| WO | 2021013377 | A1 | 1/2021 |
| WO | 2022002995 | A1 | 1/2022 |
| WO | 2022112552 | A1 | 6/2022 |
| WO | 2022223427 | A1 | 10/2022 |
| WO | 2023001782 | A2 | 1/2023 |
| WO | 2023001783 | A1 | 1/2023 |
| WO | 2024156803 | A1 | 8/2024 |

OTHER PUBLICATIONS

Claumarchirant et al. Sterol Composition in Infant Formulas and Estimated IntakeJ. Agric. Food Chem. 2015, 63, 32, 7245-7251.

Claumarchirant, L., et al. "Addition of milk fat globule membrane as an ingredient of infant formulas for resembling the polar lipids of human milk." International Dairy Journal 61 (2016): 228-238.

Fong, B., et al. (2011). Liquid chromatography-high-resolution electrostatic ion-trap mass spectrometric analysis of GD3 ganglioside in dairy products. International dairy journal, 21(1), 42-47.

Gurnida, D. A., et al. "Association of complex lipids containing gangliosides with cognitive development of 6-month-old infants." Early human development 88.8 (2012): 595-601.

Harit, D., et al. "Lipid profile of term infants on exclusive breastfeeding and mixed feeding: a comparative study." European journal of clinical nutrition 62.2 (2008): 203-209.

Jensen, R. G. "The lipids in human milk." Progress in lipid research 35.1 (1996): 53-92.

Jeppesen, D. K., et al. "Comparative analysis of discrete exosome fractions obtained by differential centrifugation." Journal of extracellular vesicles 3.1 (2014): 25011.

Lacomba, R., et al. (2011). Sialic acid (N-acetyl and N-glycolylneuraminic acid) and ganglioside in whey protein concentrates and infant formulae. International dairy journal, 21(11), 887-895.

Ma, L., et al. (2015). Determination of ganglioside concentrations in breast milk and serum from Malaysian mothers using a high performance liquid chromatography-mass spectrometry-multiple reaction monitoring method. International Dairy Journal, 49, 62-71.

Owen, C. G., et al. "Does initial breastfeeding lead to lower blood cholesterol in adult life? A quantitative review of the evidence." The American journal of clinical nutrition 88.2 (2008): 305-314.

Westergaard, Milk Powder Technology—evaporation and spray drying, 5th edition, 2010, Gea Niro, Copenhagen.

Boyd, L. C, et al., "Isolation And Characterization Of Whey Phospholipids", J. Dairy Sci., 82(12): 2550-2557 (1999).

Piot, M., et al., "Microfiltration en flux tangentiel des lactoserums de fromagerie", Dairy Sci. Technol. (LE LAIT), 64: 102-120 (1984).

Sachdeva, S., et al., "Recovery of phospholipids from buttermilk using membrane processing", Kieler Milchwirtschaftliche Forschungsberichte, 49(1), 47-68 (1997).

Arla Foods Ingredients. Product Specification of Lacprodan MFGM-10. Accessed on or before Aug. 6, 2025 (1 page).

Babawale, E. A., et al. "Modulating sterol concentrations in infant formula influences cholesterol absorption and synthesis in the neonatal piglet." Nutrients 10.12 (2018): 1848.

Calvo, M. V., et al. "Comprehensive characterization of neutral and polar lipids of buttermilk from different sources and its milk fat globule membrane isolates." Journal of Food Composition and Analysis 86 (2020): 103386.

European Patent Office. Communication of a notice of opposition for Application No. 21819123.7, dated Aug. 11, 2025 (24 pages).

European Union. Commission Delegated Regulation (EU) 2016/127. Sep. 25, 2015 (29 pages).

Innova Market Insights. Enfagrow Neuropro Toddler Nutritional Drink With Natural Milk Flavor For Toddlers From 1 Year Old Onwards, Jul. 2019 (3 pages).

Moloney, C. et al. "Polar lipid, ganglioside and cholesterol contents of infant formulae and growing up milks produced with an alpha lactalbumin-enriched whey protein concentrate." International Dairy Journal 107 (2020): 104716.

Semper. BabySemp® composition (original), from: https://www semper.se/barnmat/produkter/modersmjolksersattning/babysemp-1-drickfardig-200ml (retrieved on Jul. 29, 2025), with machine translation, (10 pages).

Small Entity Compliance Guide: Trans Fatty Acids in Nutrition Labeling, Nutrient Content Claims, and Health Claims, Aug. 2003, 5 pages.

Souci, S.W. et al., Food Compositions and Nutrition Tablews, MedPharm Scientific Publishers, 2008, 7th edition, (6 pages).

Anonymous: "Molecular weight cutoff (MWCO)"—Jul. 12, 2021, pp. 1-2, XP055874091, retrieved Dec. 17, 2021) (2 pages).

Anonymous: "Sanitary Microfiltration Spiral-Wound Element: FR (PVDF 800kDa)" Synder Filtration, Sep. 9, 2015, pp. 1-2, XP093078374, retrieved Sep. 4, 2023 (2 pages).

Ascanius, S. R. et al: "Mild-Derived Extracellular Vesicles Suppress Inflammatory Cytokine Expression and Nuclear Factor-(kappa)B Activation in Lipopolysaccharide-Stumulated Marcophages" DAIRY, vol. 2, Mar. 24, 2021, pp. 165-178.

Bach Korsholm Knudsen, K., et al. "Bovine Milk-Derived Emulsifiers Increase Triglyceride Absortion in Newborn Formula-Fed Pigs" Nutrients, vol. 13, No. 2, Jan. 28, 2021, p. 410.

Benmoussa A, et al. A subset of extracellular vesicles carries the bulk of microRNAs in commercial dairy cow's milk. J Extracell Vesicles. Nov. 21, 2017; 6(1): 1401897.

Benmoussa, A. et al. "Milk microRNAs in health and disease." Comprehensive Reviews in food science and food safety 18.3 (2019): 703-722.

Blans et al "Pellet-free isolation of human and bovine milk extracellular vesicles by size-exclusion chromatography" 2017; Journal of Extracellular Vesicles, 6:1, 1294340.

Christensen, B. et al. "Structure, function and nutritional potential of milk osteopontin." International Dairy Journal 57 (2016): 1-6. Fig. 1 of Fig. 1.

Database GNPD (Online), MINTEL; Aug. 26, 2010, anonymous: "Stage 1 Baby Formula", XP093079115, Database accession No. 1378069 (1-4).

(56) References Cited

OTHER PUBLICATIONS

De Boer, R.: "Information Sheets—Milk—Lipids—Cheese—Whey" In: From Milk By-Products to Milk Ingredients : Upgrading the Cycle. May 2, 2014, pp. 208-261.
Fontecha, J., et al. "Sources, production, and clinical treatments of milk fat globule membrane for infant nutrition and well-being." Nutrients 12.6 (2020): 1607.
García-Martínez J, et al; Beneficial Effects of Bovine Milk Exosomes in Metabolic Interorgan Cross-Talk; Nutrients. Mar. 30, 2022;14(7):1442.
Golan-Gerstl R. et al: "Characterization and biological function of milk-derived miRNAs", Molecular Nutrition & Food Research, vol. 61, No. 10, Jul. 31, 2017, p. 1700009.
Hvarregaard, J., et al. "Characterization of glycoprotein PAS-6/7 from membranes of bovine milk fat globules." European Journal of Biochemistry 240.3 (1996): 628-636.
Lässer C, et al. Human saliva, plasma and breast milk exosomes contain RNA: uptake by macrophages. J Transl Med. Jan. 14, 2011;9:9 (8 pages).
Leiferman A, et al. Storage of Extracellular Vesicles in Human Milk, and MicroRNA Profiles in Human Milk Exosomes and Infant Formulas. J Pediatr Gastroenterol Nutr. Aug. 2019;69(2):235-238.
Leroux C, et al. Perspective: Milk microRNAs as Important Players in Infant Physi-ology and Development. Adv Nutr. Oct. 1, 2021;12(5): 1625-1635.
Li, F., et al. "Improved neurodevelopmental outcomes associated with bovine milk fat globule membrane and lactoferrin in infant formula: a randomized, controlled trial." The Journal of pediatrics 215 (2019): 24-31.
Liao Y, et al. Human milk exosomes and their microRNAs survive digestion in vitro and are taken up by human intestinal cells. Mol Nutr Food Res. Nov. 6, 20171(11) 1700082.
Monaco, M. H., et al. "Whey protein lipid concentrate high in milk fat globule membrane components inhibit porcine and human rotavirus in vitro." Frontiers in pediatrics 9 (2021): 731005.
Murphy, E. G., et al. "A high-solids steam injection process for the manufacture of powdered infant milk formula." Dairy Science & Technology 93 (2013): 463-475.
Navis, M., et al. "Mildly pasteurized whey protein promotes gut tolerance in immature piglets compared with extensively heated whey protein." Nutrients 12.11 (2020): 3391.
Nielsen, W.K. (ed). Membrane filtration and related molecular separation technologies, APV Systems, Silkeborg Bogtrykkeri 2003, ISBN 8788016757-9788788016758.
Rahman, Md et al "Acidification effects on isolationof extracellular vesicles from bovine milk" PLOS ONE, vol. 14, No. 9, Sep. 16, 2019, p. e0222613.
Rocha-Mendoza D. et al: "Invited review: Acid whey trends and health benefits" Journal of Dairy Science, American Dairy Science Association, vol. 104, No. 2, Dec. 23, 2020, pp. 1262-1275.
Sari, R. N., et al. "Comparative proteomics of human milk from eight cities in China during six months of lactation in the Chinese human milk project study." Frontiers in Nutrition 8 (2021): 682429.
Smyczynska U, et al. Impact of processing method on donated human breast milk microRNA content. PLOS One. Jul. 15, 2020;15(7):e0236126.
Van Herwijnen MJC, et al. "Abundantly present miRNAs in milk-derived extracellular vesicles are conserved between mammals." Frontiers in nutrition 5 (2018): 81.
Wijayanti, H. B., et al. "Stability of whey proteins during thermal processing: A review." Comprehensive reviews in food science and food safety 13.6 (2014): 1235-1251.
Wiking, L., et al. "Heat-induced changes in milk fat and milk fat globules and its derived effects on acid dairy gelation—a review." International Dairy Journal 127 (2022): 105213.
Zonneveld Mi, et al. Human milk extracellular vesicles target nodes in interconnected signalling pathways that enhance oral epithelial barrier function and dampen immune responses. J Extracell Vesicles. 2021; 10:e12071.
European Patent Office Communication of Third Party Observation for Application No. 22740930.7 dated Jan. 2, 2026 (4 pages).
Arla Foods Ingredients Group P/S, "Application to Permit the Optional Use of Milkfat Globule Membrane Enriched Whey Protein Concentrate in Infant Formula Products", Accessed on Jan. 2, 2026 (198 pages).
Loveday, "B-Lactoglobulin heat denaturation: A critical assessment of kinetic modelling", Imernational Dairy Journal 52 (2016) 92-100 (9 pages).
Arla Foods Ingredients, Lacprodan MFGM-10, whey protein concentrate, Product Sheet 1401, dated Mar. 30, 2015 (1 page).
Chen, M., et al. "Determination of native lactoferrin in milk by HPLC on HiTrapTM Heparin HP column." Food Analytical Methods 12.11 (2019): 2518-2526.
Christie, W. W., et al. "Phospholipids in milk and dairy products." International Journal of Dairy Technology 40.1 (1987): 10-12.
Zhang, Y. et al. "Determination of bovine lactoferrin in food by HPLC with a heparin affinity column for sample preparation." Journal of AOAC International 100.1 (2017): 133-138.
Ely, I. A., et al. "The Effect of Leucine-Enriched B-Lactoglobulin Versus an Isonitrogenous Whey Protein Isolate on Skeletal Muscle Protein Anabolism in Young Healthy Males." Nutrients 17.21 (2025): 3410.
Hansen, M. S., et al. "Bovine milk processing impacts characteristics of extracellular vesicle isolates obtained by size-exclusion chromatography." International Dairy Journal 127 (2022): 105212.

* cited by examiner

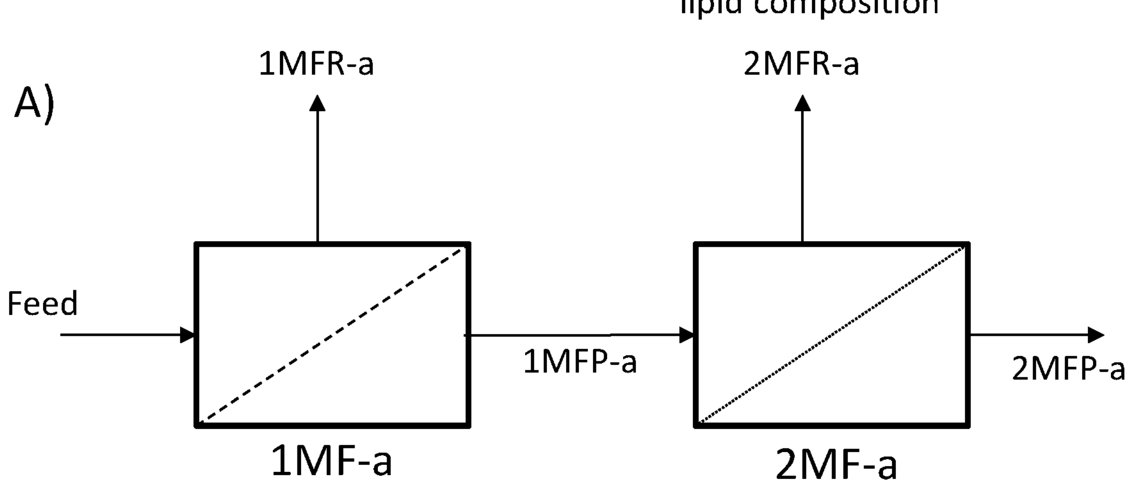
High cholesterol milk lipid composition
1MFR-a
2MFR-a
A)
Feed
1MFP-a
2MFP-a
1MF-a
2MF-a
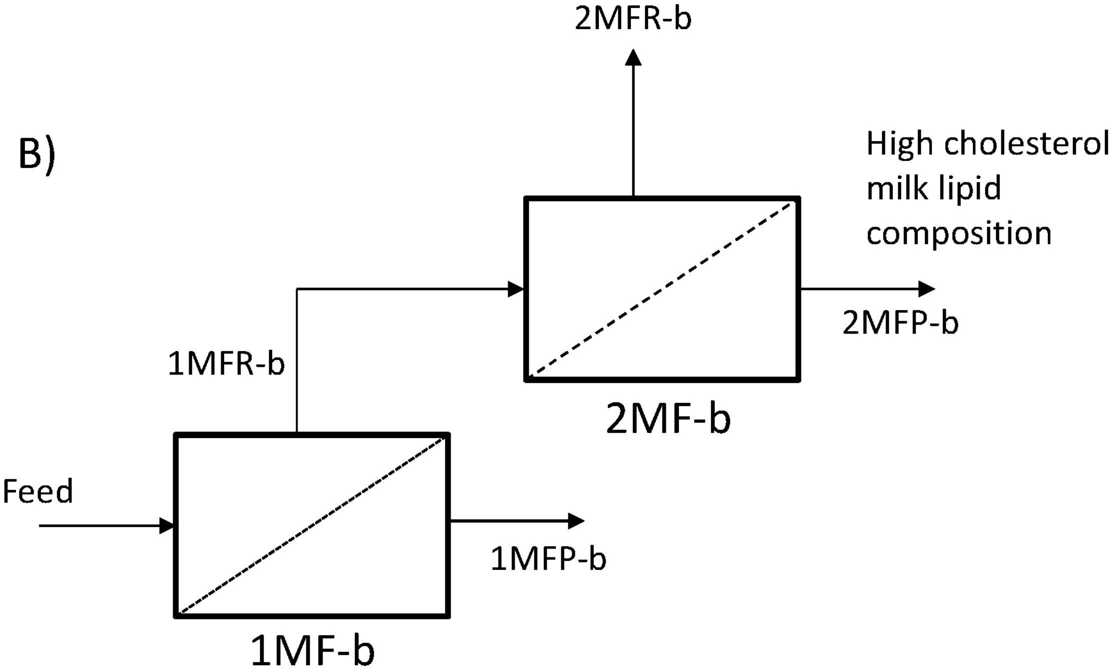
2MFR-b
B)
High cholesterol milk lipid composition
1MFR-b
2MFP-b
2MF-b
Feed
1MFP-b
1MF-b

CHOLESTEROL-ENRICHED MILK LIPID COMPOSITION SUITABLE FOR INFANT NUTRITION, METHOD OF PRODUCTION, AND NUTRITIONAL COMPOSITIONS COMPRISING THE MILK LIPID COMPOSITION

FIELD OF THE INVENTION

The present invention pertains to methods of producing cholesterol-enriched milk lipid compositions suitable for infant nutrition by membrane-based fractionation of dairy based whey, to the cholesterol-enriched milk lipid compositions as such, and to their uses as food ingredients.

BACKGROUND

Milk lipids play an important role in infant nutrition and provide the infant with energy, essential vitamins, polyunsaturated fatty acids, and bioactive components. Milk lipids furthermore contribute to the development of the nervous system and the brain of the infant. Cholesterol provided by breastfeeding modulates infant sterol metabolism and may induce long-term benefits. Some 98-99% of human milk lipids are comprised by triacylglycerols, whose properties depend on incorporated fatty acids. Attention has been devoted to the roles of the long-chain polyunsaturated fatty acids docosahexaenoic (DHA) and arachidonic (ARA) acids. Recent studies show that breastfeeding providing DHA and ARA improves cognitive development and reduces asthma risk at school age particularly in those children with a genetically determined lower activity of DHA and ARA synthesis.

Lipid fractions for infant nutrition may be derived from bovine milk e.g. by solvent extraction or supercritical fluid extraction.

WO 2006/041316 A1 discloses processes for producing dairy products having low levels of neutral lipids, and/or higher levels of polar lipids, by extraction using near critical carbon dioxide or dimethyl ether.

JPH 0 530903 A discloses the use of butter serum products as a source of cholesterol and phospholipids in infant formula products. Butter serum is a by-product when producing butter oil from butter or cream. Butter serum are rich in cholesterol-containing fat globule membrane material, and exemplifies cholesterol contents of 0.5-10 g/100 g fat. JPH 0 530903 A furthermore suggests using butter serum for increasing the cholesterol and phospholipid levels of infant formula products to resemble the levels found in human breast milk. No details regarding the content of trans-fatty acids are provided.

Boyd et al ("Isolation and characterization of whey phospholipids"; Journal of Dairy Science, vol. 82, no. 12, 1999, p. 2550-2557) discloses a method of isolating and characterizing whey phospholipids. The phospholipids were isolated by microfiltration (and the MF retentate was subsequent dialysed using a 6 kDa membrane. The phospholipids were further extracted from the MF retentate by solvent extraction and characterized by HPLC.

Sachdeva et al ("Recovery of phospholipids from buttermilk using membrane processing"; Kieler Wirtschaftliche Forschungsberichte, vol. 49, no. 1, 1997, p. 47-68) discloses a method of isolating of phospholipids from "buttermilk whey" by rennet- or citric acid-based precipitation of reconstituted sweet buttermilk powder. The isolation involved a combination of ultrafiltration and microfiltration/diafiltration.

EP 2 452 567 A1 discloses the production of a powder comprising protein in an amount of 15 to percent by dry weight, fat in an amount of 45 to 60 percent by dry weight, and milk-derived complex lipids in an amount of 20 percent by dry weight or more. The powder is produced by adjusting the pH value of a butter serum or reconstituted butter serum powder to 4.0-5.0, to cause isoelectric precipitation to remove casein sediments, filtering the supernatant by means of ultrafiltration or microfiltration, and then drying the obtained concentrate. During the process of precipitating and removing casein at its isoelectric point, calcium chloride is added by 0.01 to 0.1 percent by weight relative to the total quantity to promote precipitation so that casein sediments can be removed efficiently even when the mixture is kept stationary.

Piot et al ("Microfiltration en flux tangentiel des lactoserums de fromagerie"; Le Lait, vol. 64, 1984, p. 102-120) discloses a test of several types of microfiltration membranes for clarification and bacterial reject from the cheese whey and investigates the maximum permeability of whey proteins through the membrane. The results showed that all the tested membranes clogged up more or less with regard to the permeation of whey proteins in the microfiltrate under experimental conditions. It was possible to obtain protein permeation of more than 80% with 0.4 micron polycarbonate microfilters but the values were lower with the other polymeric membranes or mineral membranes. Piot et al established that the decimal reduction of microorganisms in microfiltrate could be equal to 5 when compared to the cheese whey. Unfortunately they did not find the ideal membrane which would simultaneously satisfy all the above parameters and which would present a flux at least, similar with the one obtained with ultrafiltration membranes.

SUMMARY OF THE INVENTION

The present inventors have found that nutritionally valuable, high cholesterol milk lipid compositions can be prepared by processing whey streams by a special sequence of serial microfiltration. The new milk lipid compositions can advantageously be used as ingredients in infant formulas.

The present method can be performed in two variants, i.e. method variant A (referred to as method A) and method variant B (referred to as method B). The method comprises 1), 2) and 3) and an optional step 4). Steps 2), 3) and 4) differ between methods A and B and we therefore use "-a" as suffix to show when a given feature relates to method A and the suffix "-b" to show when a given feature relates to method B. The two method variants have been illustrated in FIG. 1 as variants A) and B).

An aspect of the invention pertains to aspect a method of preparing a milk lipid composition comprising total cholesterol in an amount of 4-12% w/w relative to total lipid and comprising total lipid in an amount of 10-60% w/w relative to total solids, wherein the method is method A or method B.

Thus, a specific aspect of the invention pertains to a method, i.e. method A, of preparing a milk lipid composition comprising total cholesterol in an amount of 4-12% w/w relative to total lipid and comprising total lipid in an amount of 10-60% w/w relative to total solids, the method comprising the steps of:

1) providing a whey from mammal milk, and optionally subjecting the whey to one or more steps of
   - removal of particles larger than 0.8 micron,
   - concentration,
   - dilution, and pH adjustment to obtain a pH in the range of 3-8, thereby providing a liquid feed having a pH in the range of 3-8, 2-a) subjecting the liquid feed to a first microfiltration step (1MF-a) thereby providing a first MF retentate (1MFR-a) and a first MF permeate (1MFP-a), wherein 1MF-a preferably is operated to provide a 1MFR-a having a particle mode size of at least 200 nm and/or a 1MFP-a having a particle mode size of at most 190 nm, 3-a) subjecting the 1MFP-a or a concentrate or dilution thereof to a second MF step (2MF-a) to provide a second MF retentate (2MFR-a) and a second MF permeate (2MFP-a), wherein particles of larger hydrodynamic diameter are transferred to the permeate during 1MF-a than during 2MF-a, and wherein 2MF-a preferably is operated to provide a 2MFR-a having a particle mode size of at least 165 nm and/or a 2MFP-a having a particle mode size of at less than 165 nm, 4-a) optionally, concentrating and/or drying the 2MFR-a, and preferably, wherein the MF membranes and conditions used during 1MF-a and 2MF-a provide a 2MFR-a that has a content of native BLG of at most 40% relative to total protein, and wherein the milk lipid composition is the 2MFR-a or, if step 4-a) is used, the concentrate or dried product resulting from step 4-a).

Another specific aspect of the invention pertains to a method, i.e. method B, of preparing a milk lipid composition comprising total cholesterol in an amount of 4-12% w/w relative to total lipid and comprising total lipid in an amount of 10-60% w/w relative to total solids, the method comprising the steps of:

1) providing a whey from mammal milk, and optionally subjecting the whey to one or more steps of
removal of particles larger than 0.8 micron,
concentration,
dilution, and
pH adjustment to obtain a pH in the range of 3-8, thereby providing a liquid feed having a pH in the range of 3-8, 2-b) subjecting the liquid feed to a first microfiltration step (1MF-b) thereby providing a first MF retentate (1MFR-b) and a first MF permeate (1MFP-b), wherein 1MF-b preferably is operated to provide a 1MFR-b having a particle mode size of at least 150 nm and/or a 1MFP-b having a particle mode size of less than 200 nm, 3-b) subjecting the 1MFR-b or a concentrate or dilution thereof to a second MF step (2MF-b) to provide a second MF retentate (2MFR-b) and a second MF permeate (2MFP-b), and wherein particles of larger hydrodynamic diameter are transferred to the permeate during 2MF-b than during the 1MF-b, and wherein 2MF-b preferably is operated to provide a 2MFR-b having a particle mode size of at least 200 nm and/or a 2MFP-b having a particle mode size of at most 300 nm, 4-b) optionally, concentrating and/or drying the 2MFR-b, and preferably, wherein the MF membranes and conditions used during 1MF-b and 2MF-b provide a 2MFP-b that has a content of native BLG of at most 40% relative to total protein, and wherein the milk lipid composition is the 2MFP-b or, if step 4-b) is used, the concentrate or dried product resulting from step 4-b).

Yet an aspect of the invention pertains to a milk lipid composition, preferably derived from whey, comprising total cholesterol in an amount of 4-12% w/w relative to total lipid, and furthermore containing:

total lipid in an amount of 10-60% w/w relative to total solids,
phospholipids in an amount of at least 40% w/w relative to total lipids,
preferably, a weight ratio between cholesterol and trans-fatty acids of at least 2.0
total protein in an amount of 30-80% w/w relative to total solids, and
the sum of total ALA, total BLG and CMP constitutes at most 70% w/w of total protein.

A further aspect of the invention pertains to a nutritional composition comprising:

the milk lipid composition as described herein or obtainable according to the method as described herein, and
one or more additional food ingredients.

An even further aspect of the invention pertains to the use of the milk lipid composition as described herein or obtainable according to the method as described herein in the production of a nutritional product, preferably an infant formula, and preferably using the milk lipid composition for increasing the content of one or more of:
cholesterol,
phospholipid,
sphingomyelin, and
ganglioside, or
or
reducing the content of trans fatty acids, preferably relative to total cholesterol, total lipid or total phospholipid, of the nutritional composition.

BRIEF DESCRIPTION OF THE FIGURE

FIG. 1 is a schematic illustration of the two method variants of the present invention. FIG. 1A) illustrates method A. FIG. 1B) illustrates method B.

DETAILED DESCRIPTION OF THE INVENTION

In the context of the present invention the term "milk lipid composition" pertains to composition derived from milk, preferably by converting the milk to whey and collection a fraction of the lipids of the whey. A milk lipid composition contains total lipids in an amount of at least 10% w/w relative to total solids.

In the context of the present invention the term "lipids" has its usual meaning and encompasses e.g. triacyl glycerides (TAG), phospholipids (PL), and sphingolipids. Total lipids are quantified according to the Röse Gottlieb method.

In the context of the present invention the term "total cholesterol" pertains to sum of free cholesterol and ester-bound cholesterol and is measured as outlined in Example 2.

In the context of the present invention the term "microfiltration" pertains to filtration using membranes having pore size of approx. 0.02-10 micron.

In the context of the present invention the term "mammal milk" pertains to milk obtained or obtainable from a mammary gland of a mammal. The mammal milk is preferably obtained by milking a mammal or but the term "mammal milk" also covers milk obtained from cultured cells and preferably cultured mammary gland cells.

In the context of the present invention the term "whey" pertains to the liquid which is left in the liquid phase when casein is precipitated in milk by means of e.g. acidification and/or protein degradation (e.g. using rennet enzyme during production of cheese). The whey obtained from rennet-based precipitation of casein is typically referred to as sweet whey and the whey obtained from acid precipitation of casein is typically referred to as acid whey, sour whey or casein whey.

In the context of the present invention the term "particle mode size" pertains to the peak of the frequency particle size distribution and is measured as described in Example 1.

In the context of the present invention the term "concentrating" or "concentrate" (used as a verb) pertains to the process of increasing the solids content of a liquid by removal of at least water and optionally also salts and small molecules such as e.g. disaccharides or free amino acids. The term "concentrate" used as a noun pertains to the product obtained by concentrating a liquid.

In the context of the present invention the term "diluting" or "dilute" (used as a verb) pertains to the process of reducing the solids content of a liquid by addition of an aqueous solvent, preferably water. The term "dilution" used as a noun pertains to the product obtained by diluting a liquid or to dilution as a process step, depending on the context.

In the context of the present invention, the term "beta-lactoglobulin" or "BLG" pertains to beta-lactoglobulin (BLG) from mammal species. BLG is the most predominant protein in bovine whey and milk serum and exists in several genetic variants, the main ones in cow milk being labelled A and B. BLG is a lipocalin protein, and can bind many hydrophobic molecules, suggesting a role in their transport. BLG has also been shown to be able to bind iron via siderophores and might have a role in combating pathogens. A homologue of BLG is lacking in human breast milk.

Bovine BLG is a relatively small protein of approx. 162 amino acid residues with a molecular weight of approx. 18.3-18.4 kDa. Under physiological conditions it is predominantly dimeric, but dissociates to a monomer below about pH 3, preserving its native state as determined using NMR. Conversely, BLG also occurs in tetrameric, octameric and other multimeric aggregation forms under a variety of natural conditions.

In the context of the present invention the term "native beta-lactoglobulin" pertains to beta-lactoglobulin (BLG) in the non-denatured, folded conformation in which it exists milk that has only been subjected to no or gentle heat-treatment. The content of native beta-lactoglobulin is measured as described in Example 2.

In the context of the present invention, the term "infant formula" pertains to nutritionally complete food products for infants of 0-6 months which food products comply with the US Code of Federal Regulations, Title 21, CHAPTER I, SUBCHAPTER B, PART 107 (INFANT FORMULA), Subpart D (Nutrient Requirements); Sec. 107.100 Nutrient specifications as in force on 1 Apr. 2015.

Thus, a broad aspect of the invention pertains to a method of preparing a milk lipid composition comprising total cholesterol in an amount of 4-12% w/w relative to total lipid and comprising total lipid in an amount of 10-60% w/w relative to total solids, which method involves subjecting a liquid feed prepared from whey to at least two serial microfiltration steps, and wherein the method is implemented according to method A or method B.

Thus, an aspect of the invention pertains to method A of preparing a milk lipid composition comprising total cholesterol in an amount of 4-12% w/w relative to total lipid and comprising total lipid in an amount of 10-60% w/w relative to total solids, the method comprising the steps of:

1) providing a whey from mammal milk, and optionally subjecting the whey to one or more steps of
   removal of particles larger than 0.8 micron,
   concentration,
   dilution, and
   pH adjustment to obtain a pH in the range of 3-8, thereby providing a liquid feed having a pH in the range of 3-8, 2-a) subjecting the liquid feed to a first microfiltration step (1MF-a) thereby providing a first MF retentate (1MFR-a) and a first MF permeate (1MFP-a), wherein 1MF-a preferably is operated to provide a 1MFR-a having a particle mode size of at least 200 nm and/or a 1MFP-a having a particle mode size of at most 190 nm, 3-a) subjecting the 1MFP-a or a concentrate or dilution thereof to a second MF step (2MF-a) to provide a second MF retentate (2MFR-a) and a second MF permeate (2MFP-a), wherein particles of larger hydrodynamic diameter are transferred to the permeate during 1MF-a than during 2MF-a, and wherein 2MF-a preferably is operated to provide a 2MFR-a having a particle mode size of at least 165 nm and/or a 2MFP-a having a particle mode size of at less than 165 nm, 4-a) optionally, concentrating and/or drying the 2MFR-a, and preferably, wherein the MF membranes and conditions used during 1MF-a and 2MF-a provide a 2MFR-a that has a content of native beta-lactoglobulin (BLG) of at most 40% relative to total protein, and wherein the milk lipid composition is the 2MFR-a or, if step 4-a) is used, the concentrate or dried product resulting from step 4-a).

The MF membrane used in 2MF-a preferably has a smaller effective pore size than the membrane used for 1MF-a and therefore retains smaller particles than the membrane used for 1MF-a.

Another aspect of the invention pertains to method B of preparing a milk lipid composition comprising total cholesterol in an amount of 4-12% w/w relative to total lipid and comprising total lipid in an amount of 10-60% w/w relative to total solids, the method comprising the steps of:

1) providing a whey from mammal milk, and optionally subjecting the whey to one or more steps of
   removal of particles larger than 0.8 micron,
   concentration,
   dilution, and
   pH adjustment to obtain a pH in the range of 3-8, thereby providing a liquid feed having a pH in the range of 3-8, 2-b) subjecting the liquid feed to a first microfiltration step (1MF-b) thereby providing a first MF retentate (1MFR-b) and a first MF permeate (1MFP-b), wherein 1MF-b preferably is operated to provide a 1MFR-b having a particle mode size of at least 150 nm and/or a 1MFP-b having a particle mode size of less than 200 nm, 3-b) subjecting the 1MFR-b or a concentrate or dilution thereof to a second MF step (2MF-b) to provide a second MF retentate (2MFR-b) and a second MF permeate (2MFP-b), and wherein particles of larger hydrodynamic diameter are transferred to the permeate during 2MF-b than during the 1MF-b, and wherein 2MF-b preferably is operated to provide a 2MFR-b having a particle mode size of at least 200 nm and/or a 2MFP-b having a particle mode size of at most 300 nm, 4-b) optionally, concentrating and/or drying the 2MFR-b, and preferably, wherein the MF membranes and conditions used during 1MF-b and 2MF-b provide a 2MFP-b that has a content of native BLG of at most 40% relative to total protein, and wherein the milk lipid composition is the 2MFP-b or, if step 4-b) is used, the concentrate or dried product resulting from step 4-b).

Step 1) is common for methods A and B and involves providing a whey from mammal milk, and optionally subjecting the whey to one or more steps of removal of particles larger than 0.8 micron, concentration, dilution, and pH adjustment to obtain a pH in the range of 3-8, thereby providing a liquid feed having a pH in the range of 3-8, In some preferred embodiments of the invention the mammal milk has a total lipid content of at most 1% w/w, more preferably at most 0.5% w/w, even more preferably at most 0.10% w/w and most preferably at most 0.08% w/w.

Preferably, the mammal milk is skim milk.

The mammal milk preferably has a weight ratio between casein and whey protein in the range of 30:70-84:16, more preferably 50:50-84:16, and most pref. 70:30-84:16.

The mammal milk typically comprises or even consist of milk from one or more of the following mammals: human, cow, goat, sheep, mare, camel, yak, and buffalo.

The mammal milk preferably comprises or even consist of bovine milk.

In some preferred embodiments of the invention the mammal milk has a degree of whey protein denaturation of at most 30%, more preferably at most 20%, even more preferably at most 15%, and most preferably at most 10%.

In some preferred embodiments of the invention the preparation of the whey involves acidification of the milk and subsequent precipitation of casein and removal of the precipitated casein.

In other preferred embodiments of the invention the preparation of the whey involves addition of protease enzyme, preferably rennet, to the milk and subsequent precipitation of casein and removal of the precipitated casein.

In some preferred embodiments of the invention the whey has a degree of BLG protein denaturation of at most 30%, more preferably at most 20%, even more preferably at most 15%, and most preferably at most 10%.

In some preferred embodiments of the invention the liquid feed is the whey as such.

In some preferred embodiments of the invention the provision of the liquid feed involves removal of particles larger than 0.8 micron.

In some preferred embodiments of the invention the provision of the liquid feed involves concentration of the whey or a product stream derived from the whey, e.g. by one or more of UF, NF, RO and evaporation.

In some preferred embodiments of the invention the provision of the liquid feed involves a pH adjustment to obtain a pH in the range of 3-8.

In some preferred embodiments of the invention the provision of the liquid feed involves subjecting the whey or a product stream derived from the whey to:

removal of particles larger than 0.8 micron, and concentration.

In some preferred embodiments of the invention the liquid feed has a weight ratio between casein and whey protein of at most 0.20, more preferably at most 0.10, even more preferably at most 0.06 and most preferably at most 0.05.

It is particularly preferred that the provision of the liquid feed does not involve filtration that re-moves particles having a hydrodynamic diameter of 0.3 micron or lower.

It is furthermore preferred that the provision of the liquid feed does not involve homogenization of the mammal milk or subsequent product streams leading to the liquid feed.

In some preferred embodiments of the invention the liquid feed has a degree of BLG denaturation of at most 30%, more preferably at most 20%, even more preferably at most 15%, and most preferably at most 10%.

In some preferred embodiments of the invention the liquid feed has a content of total solids in the range of 0.01-50% w/w, more preferably in the range of 0.05-30% w/w, even more preferably 0.1-20% w/w, and most preferably 0.5-15% w/w.

In some preferred embodiments of the invention the liquid feed has a content of total solids in the range of 0.1-50% w/w, more preferably in the range of 0.5-30% w/w, even more preferably 1-20% w/w, and most preferably 4-15% w/w.

In some preferred embodiments of the invention the liquid feed has a content of total lipids of in the range of 0.5-9% w/w relative to total solids, more preferably in the range of 1-8% w/w, even more preferably 2-7% w/w, and most preferably 2.5-6% w/w relative to total solids.

In some preferred embodiments of the invention the liquid feed has a content of total protein of in the range of 12-90% w/w relative to total solids, more preferably in the range of 40-89% w/w, even more preferably 50-88% w/w, and most preferably 70-87% w/w relative to total solids.

In some preferred embodiments of the invention the liquid feed has a content of lactose of 0-80% w/w relative to total solids, more preferably in the range of 1-50% w/w, even more preferably 2-40% w/w, and most preferably 3-20% w/w relative to total solids.

In some preferred embodiments of the invention the liquid feed has a content of lactose of at most 20% w/w relative to total solids, more preferably at most 10% w/w, even more preferably at most 5% w/w, and most preferably at most 1% w/w relative to total solids.

In some preferred embodiments of the invention the liquid feed has a content of total triacyl-glyceride (TAG) in the range of 0.5-6% w/w relative to total solids, more preferably in the range of 1-5% w/w, even more preferably 1.5-4.5% w/w, and most preferably 2-4% w/w relative to total solids.

TAG content is determined by subtracting the phospholipid content from the total lipid content.

In other preferred embodiments of the invention the liquid feed has a content of total TAG of at most 6% w/w relative to total solids, more preferably at most 5% w/w, even more preferably at most 2% w/w, and most preferably at most 1% w/w relative to total solids.

In some preferred embodiments of the invention the liquid feed has a content of total PL in the range of 1-6% w/w relative to total solids, more preferably in the range of 1.2-5% w/w, even more preferably 1.4-4% w/w, and most preferably 1.5-3% w/w relative to total solids.

In some preferred embodiments of the invention the liquid feed has an ash value in the range of 1-10% w/w relative to total solids, more preferably in the range of 1.5-8% w/w, even more preferably 1.5-7% w/w, and most preferably 2.0-6.5% w/w relative to total solids.

In other preferred embodiments of the invention the liquid feed has an ash value in the range of 1-6% w/w relative to total solids, more preferably in the range of 1.5-5% w/w, even more preferably 2-4% w/w, and most preferably 2.0-3.0% w/w relative to total solids In some preferred embodiments of the invention the liquid feed has a pH in the range of 4-8, more preferably in the range of 5-7.5, and most preferably in the range of 6-7.5.

The pH values mentioned herein are preferably pH values measured at 20 degrees C. or normalized to 20 degrees C.

Step 2-a) involves subjecting the liquid feed to a first microfiltration step (1MF-a) thereby providing a first MF retentate (1MFR-a) and a first MF permeate (1MFP-a), wherein 1MF-a preferably is operated to provide a 1MFR-a having a particle mode size of at least 200 nm and/or a 1MFP-a having a particle mode size of at most 190 nm.

In some preferred embodiments of the invention 1MF-a is operated to provide a 1MFR-a having a particle mode size of at least 200 nm, more preferably at least 205 nm, even more preferably at least 210 nm, and most preferably at least 215 nm.

In other preferred embodiments of the invention 1MF-a is operated to provide a 1MFR-a having a particle mode size in the range of 200-800 nm, more preferably in the range of 205-500 nm, even more preferably in the range of 210-300 nm, and most preferably in the range of 215-280 nm.

In some preferred embodiments of the invention 1MF-a is operated to provide a 1MFP-a having a particle mode size of at most 190 nm, more preferably at most 185 nm, even more preferably at most 180 nm, and most preferably at most 170 nm.

In other preferred embodiments of the invention 1MF-a is operated to provide a 1MFP-a having a particle mode size in the range of 50-190 nm, more preferably in the range of 80-185 nm, even more preferably in the range of 100-180 nm, and most preferably in the range of 120-175 nm.

1MF-a is performed using a suitable microfiltration membrane, typically a polymeric membrane type or a ceramic membrane type. The implementation and operation of microfiltration steps is well-known to the skilled person.

1MF-a may be performed using a single MF membrane or by using several MF membranes, e.g. arranged in series. 1MF-a preferably involves diafiltration using a suitable diluent, preferably water, RO permeate, demineralised water, or a combination thereof.

The terms "1MFR-a" and "1MFP-a" pertain to the final retentate and the combined permeates obtained from 1MF-a.

1MF-a may be operated within a wide range of volume concentration factors (VCF). In some embodiments of the invention, the volume concentration factor (VCF) of 1MF-a is in the range of 0.3-5. Preferably, the VCF of 1MF-a is in the range of 0.5-4. Even more preferably, the VCF of 1MF-a is in the range of 0.5-3.

The VCF is calculated by dividing the feed volume with the retentate volume.

In some embodiments of the invention, the temperature of the liquid feed during 1MF-a is in the range of 1-66 degrees C., preferably in the range of 45-66 degrees C., even more preferably in the range of 55-66 degrees C., and most preferably in the range of 45-55 degrees C.

In other preferred embodiments of the invention, the temperature of the liquid feed during 1MF-a is in the range of 1-20 degrees C., and even more preferably in the range of 4-15 degrees C., such as e.g. 5-10 degrees C.

The trans-membrane pressure (TMP) used for 1MF-a is normally in the range of 0.1-5 bar, preferably 0.2-2 bar and even more preferred in the range of 0.3-1, such as e.g. 0.3-0.8 bar.

The membrane(s) used for 1MF-a preferably has a nominal pore size in the range of 0.1-0.7 micron; more preferably 0.2-0.6 micron, even more preferably 0.3-0.5 micron, and most preferably 0.4-0.5 micron.

A non-limiting examples of a useful membrane for 1MF-a is e.g. a ceramic TAMI 0.45 μm membrane.

It is preferred that 1MF-a is implemented with diafiltration, preferably using diluent in an amount of at least 100% vol/vol relative to the volume of the liquid feed, more preferably at least 200% vol/vol, even more preferably at least 300% vol/vol, and most preferably at least 400% vol/vol.

The diluent is preferably selected from water, RO permeate, demineralised water, or a combination thereof.

In some preferred embodiments of the invention 1MF-a is performed to obtain a 1MFP-a characterised by one or more of:

50-95% w/w of total lipids of the liquid feed have been recovered in the 1MFP-a, more preferably 55-90% w/w, even more preferred 60-85% w/w, and most preferably 65-80% w/w, at least 60% of the total PL of the liquid feed has been recovered in the 1MFP-a, more preferably at least 65% w/w, even more preferred at least 70% w/w, and most preferably at least 75% w/w, and/or at least 90% of the native BLG of the liquid feed has been recovered in the 1MFP-a, more preferably at least 95% w/w, even more preferred at least 97% w/w, and most preferably at least 98% w/w.

The recoveries mentioned herein pertain to the weight percentage of a given component (e.g. total lipids) that has been recovered in a permeate or retentate relative to the total amount of the component in the liquid subjected to the microfiltration step. For example, if a liquid contained total lipids in an amount of 100 kg and 90 kg of these were recovered in the retentate after microfiltration of the liquid then 90% w/w of the total lipids were recovered in the retentate.

When a method step is said to be "performed to obtain" a certain characteristics it means that is it operated to obtain that characteristics using process parameters well-known and available to the skilled person.

In some preferred embodiments of the invention 1MF-a is performed to obtain a 1MFP-a that has recovered at least 40% w/w of the total cholesterol of the liquid feed, more preferably at least 60% w/w, even more preferred at least 70% w/w, and most preferably at least 75% w/w. 46*b*. The method according to any of the preceding claims wherein 1MF-a is performed to obtain a 1MFP-a that has recovered at most 85% of the total TAG of the liquid feed, more preferably at most 70% w/w, even more preferred at most 60% w/w, and most preferably at most 55% w/w.

Step 3-a) involves subjecting the 1MFP-a or a concentrate or dilution thereof to a second MF step (2MF-a) to provide a second MF retentate (2MFR-a) and a second MF permeate (2MFP-a), wherein particles of larger hydrodynamic diameter are transferred to the permeate during 1MF-a than during 2MF-a, and wherein 2MF-a preferably is operated to provide a 2MFR-a having a particle mode size of at least 165 nm and/or a 2MFP-a having a particle mode size of at less than 165 nm.

2MF-a is performed using a suitable microfiltration membrane, typically a polymeric membrane type or a ceramic membrane type. The implementation and operation of microfiltration steps is well-known to the skilled person.

2MF-a may be performed using a single MF membrane or by using several MF membranes, e.g. arranged in series. 2MF-a preferably involves diafiltration using a suitable diluent, preferably water, RO permeate, demineralised water, or a combination thereof.

The terms "2MFR-a" and "2MFP-a" pertain to the final retentate and the combined permeates obtained from 2MF-a.

2MF-a may be operated within a wide range of volume concentration factors. In some embodiments of the invention, the VCF of 2MF-a is in the range of 0.3-5. Preferably, the VCF of 2MF-a is in the range of 0.5-4. Even more preferably, the VCF of 2MF-a is in the range of 0.5-3.

In some embodiments of the invention, the temperature of 1MFP-a and its subsequent retentate(s) during 2MF-a is in the range of 1-66 degrees C., preferably in the range of 45-66 degrees C., even more preferably in the range of 55-66 degrees C., and most preferably in the range of 45-55 degrees C.

In some preferred embodiments of the invention, the temperature of 1MFP-a and its subsequent retentate(s) during 2MF-a is in the range of 1-20 degrees C., and even more preferably in the range of 4-15 degrees C., such as e.g. 5-10 degrees C.

The trans-membrane pressure (TMP) used for 2MF-a is normally in the range of 0.1-5 bar, preferably 0.2-2 bar and even more preferred in the range of 0.3-1, such as e.g. 0.3-0.8 bar.

In some preferred embodiments of the invention 2MF-a is operated to provide a 2MFR-a having a particle mode size of at least 165 nm, more preferably at least 170 nm, even more preferably at least 175 nm, and most preferably at least 180 nm.

In some preferred embodiments of the invention 2MF-a is operated to provide a 2MFR-a having a particle mode size in the range of 165-300 nm, more preferably in the range of 170-260 nm, even more preferably in the range of 175-230 nm, and most preferably in the range of 175-210 nm.

In some preferred embodiments of the invention 2MF-a is operated to provide a 2MFP-a having a particle mode size of at less than 165 nm, more preferably at most 160 nm, even more preferably at most 155 nm, and most preferably at most 150 nm.

In some preferred embodiments of the invention 2MF-a is operated to provide a 2MFP-a having a particle mode size in the range of 50-164 nm, more preferably in the range of 80-160 nm, even more preferably in the range of 100-155 nm, and most preferably in the range of 120-155 nm.

The membrane(s) used for 2MF-a preferably has a nominal pore size in the range of 0.02-0.4 micron; more preferably 0.05-0.3 micron, even more preferably 0.05-0.25 micron, and most preferably 0.1-0.2 micron.

A non-limiting example of a useful membrane for 2MF-a is e.g. a ceramic TAMI 0.2 μm membrane.

In some preferred embodiments of the invention the second microfiltration step is implemented with diafiltration, preferably using diluent in an amount of at least 50% vol/vol relative to the volume of the 1MFP-a, more preferably at least 100% vol/vol, even more preferably at least 200% vol/vol, and most preferably at least 300% vol/vol.

The diluent is preferably selected from water, RO permeate, demineralised water, or a combination thereof.

In some preferred embodiments of the invention 2MF-a is performed to obtain a 2MFR-a characterised by one or more of:

30-99% w/w of total lipids of the 1MFP-a have been recovered in the 2MFR-a, more preferably 40-98% w/w, even more preferred 45-97% w/w, and most preferably 50-95% w/w, 30-99% w/w of total PL of the 1MFP-a have been recovered in the 2MFR-a, more preferably 40-98% w/w, even more preferred 45-97% w/w, and most preferably 50-95% w/w, and/or 0-20% of the native BLG of the 1MFP-a has been recovered in 2MFR-a, more preferably 0.5-15% w/w, even more preferred 1-10% w/w, and most preferably 2-5% w/w.

In some preferred embodiments of the invention 2MF-a is performed to obtain a 2MFR-a that has recovered at least 60% of the total cholesterol of the 1MFP-a, more preferably at least 80% w/w, even more preferred at least 90% w/w, and most preferably at least 95% w/w. Preferably, 2MF-a is performed to obtain a 2MFR a that has recovered at least 99% of the total cholesterol of the 1MFP-a.

Step 4-a) is optional, but if used, it involves concentrating and/or drying the 2MFR-a.

In some preferred embodiments of the invention the method comprising the drying of step 4-a).

In some preferred embodiments of the invention step 4-a) involves:

concentrating the 2MFR-a drying the 2MFR-a, or concentrating and subsequently drying the 2MFR-a.

The drying preferably provides the milk lipid composition in powder form. Any useful powder conversion process may be used, e.g. spray-drying or freeze drying. Spray-drying is particularly preferred. Suitable methods and details on implementation may e.g. be found in Westergaard, Milk Powder Technology—evaporation and spray drying, 5th edition, 2010, Gea Niro, Copenhagen.

It is furthermore preferred that the milk lipid composition, either in liquid, concentrated, or powder form, is packaged. The packaging may e.g. be performed under aseptic or sterile conditions and may e.g. involve filling and sealing the nutritional product into sterile containers.

The milk lipid composition is the 2MFR-a as such or, if step 4-a) is used, the concentrate or dried product resulting from step 4-a Preferably, the MF membranes and conditions used during 1MF-a and 2MF-a provide a 2MFR-a that has a content of native BLG of at most 40% relative to total protein.

Step 2-b) involves subjecting the liquid feed to a first microfiltration step (1MF-b) thereby providing a first MF retentate (1MFR-b) and a first MF permeate (1MFP-b), wherein 1MF-b preferably is operated to provide a 1MFR-b having a particle mode size of at least 150 nm and/or a 1MFP-b having a particle mode size of less than 200 nm, 1MF-b is performed using a suitable microfiltration membrane, typically a polymeric membrane type or a ceramic membrane type. The implementation and operation of microfiltration steps is well-known to the skilled person.

1MF-b may be performed using a single MF membrane or by using several MF membranes, e.g. arranged in series. 1MF-b preferably involves diafiltration using a suitable diluent, preferably water, RO permeate, demineralised water, or a combination thereof.

The terms "1MFR-b" and "1MFP-b" pertain to the final retentate and the combined permeates obtained from 1MF-b.

1MF-b may be operated within a wide range of volume concentration factors (VCF). In some embodiments of the invention, the volume concentration factor (VCF) of 1MF-b is in the range of 0.3-5. Preferably, the VCF of 1MF-b is in the range of 0.5-4. Even more preferably, the VCF of 1MF-b is in the range of 0.5-3.

The VCF is calculated by dividing the feed volume with the retentate volume.

In some embodiments of the invention, the temperature of the liquid feed and its subsequent retentate(s) during 1MF-b is in the range of 1-66 degrees C., preferably in the range of 45-66 degrees C., even more preferably in the range of 55-66 degrees C., and most preferably in the range of 45-55 degrees C.

In some preferred embodiments of the invention, the temperature of the liquid feed and its subsequent retentate(s) during 1MF-b is in the range of 1-20 degrees C., and even more preferably in the range of 4-15 degrees C., such as e.g. 5-10 degrees C.

The trans-membrane pressure (TMP) used for 1MF-ab is normally in the range of 0.1-5 bar, preferably 0.2-2 bar and even more preferred in the range of 0.3-1, such as e.g. 0.3-0.8 bar.

In some preferred embodiments of the invention 1MF-b is operated to provide a 1MFR-b having a particle mode size of at least 150 nm, more preferably at least 180 nm, even more preferably at least 200 nm, and most preferably at least 220 nm.

In other preferred embodiments of the invention 1MF-b is operated to provide a 1MFR-b having a particle mode size in the range of 150-800 nm, more preferably in the range of 180-700 nm, even more preferably in the range of 200-600 nm, and most preferably in the range of 220-500 nm.

In some preferred embodiments of the invention 1MF-b is operated to provide a 1MFP-b having a particle mode size of less than 200 nm, more preferably less than 180 nm, even more preferably less than 150 nm, and most preferably less than 130 nm.

In other preferred embodiments of the invention 1MF-b is operated to provide a 1MFP-b having a particle mode size in the range of 50-200 nm, more preferably in the range of 70-190 nm, even more preferably in the range of 90-170 nm, and most preferably in the range of 100-150 nm.

In some preferred embodiments of the invention the membrane(s) used for 1MF-b has a nominal pore size in the range of 0.02-0.4 micron; more preferably 0.05-0.3 micron, even more preferably 0.05-0.25 micron and most preferably 0.1-0.2 micron.

A non-limiting example of a useful membrane for 1MF-b is e.g. a ceramic TAMI 0.2 μm membrane.

In some preferred embodiments of the invention 1MF-b is implemented with diafiltration, preferably using diluent in an amount of at least 100% vol/vol relative to the volume of the liquid feed, more preferably at least 200% vol/vol, even more preferably at least 300% vol/vol, and most preferably at least 400% vol/vol.

The diluent is preferably selected from water, RO permeate, demineralised water, or a combination thereof.

In some preferred embodiments of the invention 1MF-b is performed to obtain a 1MFR-b characterised by one or more of:

- 50-95% w/w of total lipids of the liquid feed have been recovered in 1MFR-b, more preferably 55-90% w/w, even more preferred 60-85% w/w, and most preferably 65-80% w/w,
- 50-95% w/w of the PL of the liquid feed have been recovered in 1MFR-b, more preferably 55-90% w/w, even more preferred 60-85% w/w, and most preferably 65-80% w/w, and/or
- 0-20% of the native BLG of the liquid feed has been recovered in 1MFR-b, more preferably 0.5-15% w/w, even more preferred 1-10% w/w, and most preferably 2-5% w/w.

In some preferred embodiments of the invention 1MF-b is performed to obtain a 1MFR-b that has recovered at least 50% of the total cholesterol of the liquid feed, more preferably at least 70% w/w, even more preferred at least 90% w/w, and most preferably at least 95% w/w.

Even higher levels of recovery may be preferred and in other preferred embodiments of the invention 1MF-b is performed to obtain a 1MFR-b that has recovered at least 97% of the total cholesterol of the liquid feed, more preferably at least 99% w/w, and most preferably 100% w/w.

In some preferred embodiments of the invention 1MF-b is performed to obtain a 1MFR-b that has recovered at least 50% of the total TAG of the liquid feed, more preferably at least 70% w/w, even more preferred at least 90% w/w, and most preferably at least 95% w/w. Even higher levels of recovery may be preferred and in other preferred embodiments of the invention 1MF-b is performed to obtain a 1MFR-b that has recovered at least 97% of the total TAG of the liquid feed, more preferably at least 99% w/w, and most preferably 100% w/w.

Step 3-b) involves subjecting the 1MFR-b or a concentrate or dilution thereof to a second MF step (2MF-b) to provide a second MF retentate (2MFR-b) and a second MF permeate (2MFP-b), and wherein particles of larger hydrodynamic diameter are transferred to the permeate during 2MF-b than during the 1MF-b. 2MF-b is preferably operated to provide a 2MFR-b having a particle mode size of at least 200 nm and/or a 2MFP-b having a particle mode size of at most 300 nm.

2MF-b is performed using a suitable microfiltration membrane, typically a polymeric membrane type or a ceramic membrane type. The implementation and operation of microfiltration steps is well-known to the skilled person.

2MF-b may be performed using a single MF membrane or by using several MF membranes, e.g. arranged in series. 2MF-b preferably involves diafiltration using a suitable diluent, preferably water, RO permeate, demineralised water, or a combination thereof.

The terms "2MFR-b" and "2MFP-b" pertain to the final retentate and the combined permeates obtained from 2MF-b.

2MF-b may be operated within a wide range of volume concentration factors. In some embodiments of the invention, the VCF of 2MF-b is in the range of 0.3-5. Preferably, the VCF of 2MF-b is in the range of 0.5-4. Even more preferably, the VCF of 2MF-b is in the range of 0.5-3.

In some embodiments of the invention, the temperature of the liquid feed during 2MF-b is in the range of 1-66 degrees C., preferably in the range of 45-66 degrees C., even more preferably in the range of 55-66 degrees C., and most preferably in the range of 45-55 degrees C.

In some preferred embodiments of the invention, the temperature of the liquid feed during 2MF-b is in the range of 1-20 degrees C., and even more preferably in the range of 4-15 degrees C., such as e.g. 5-10 degrees C.

The trans-membrane pressure (TMP) used for 2MF-b is normally in the range of 0.1-5 bar, preferably 0.2-2 bar and even more preferred in the range of 0.3-1, such as e.g. 0.3-0.8 bar.

In some preferred embodiments of the invention 2MF-b is operated to provide a 2MFR-b having a particle mode size of at least 200 nm, more preferably at least 205 nm, even more preferably at least 210 nm, and most preferably at least 215 nm.

In other preferred embodiments of the invention 2MF-b is operated to provide a 2MFR-b having a particle mode size in the range of 200-800 nm, more preferably in the range of 205-700 nm, even more preferably in the range of 210-600 nm, and most preferably in the range of 215-500 nm.

In other preferred embodiments of the invention 2MF-b is operated to provide a 2MFP-b having a particle mode size of at most 300 nm, more preferably at most 260 nm, even more preferably at most 230 nm, and most preferably at most 210 nm.

In some preferred embodiments of the invention 2MF-b is operated to provide a 2MFP-b having a particle mode size in the range of 165-300 nm, more preferably in the range of 170-260 nm, even more preferably in the range of 175-230 nm, and most preferably in the range of 175-210 nm.

The membrane(s) used for 2MF-b preferably has a nominal pore size in the range of 0.1-0.7 micron, more preferably 0.2-0.6 micron, even more preferably 0.3-0.5 micron, and most preferably 0.4-0.5 micron.

In some preferred embodiments of the invention 2MF-b is implemented with diafiltration, preferably using diluent in an amount of at least 50% vol/vol relative to the volume of the 1MR-b, more preferably at least 100% vol/vol, even more preferably at least 200% vol/vol, and most preferably at least 300% vol/vol.

In some preferred embodiments of the invention 2MF-b is performed to obtain a 2MFP-a characterised by one or more of:

45-85% w/w of total lipids of the 1MFR-b have been recovered in the 2MFP-b, more preferably 50-85% w/w, even more preferred 55-85% w/w, and most preferably 60-85% w/w, 50-90% w/w of total PL of the 1MFR-b have been recovered in the 2MFP-b, more preferably 55-90% w/w, even more preferred 60-90% w/w, and most preferably 70-90% w/w, and/or 80-99% w/w of the native BLG of the 1MFR-b have been recovered in the 2MFP-b, more preferably 85-99% w/w, even more preferred 90-99% w/w, and most preferably 95-99% w/w.

Step 4-b) is optional, but if used it involves concentrating and/or drying the 2MFR-b, In some preferred embodiments of the invention the method comprising the drying of step 4-b).

In some preferred embodiments of the invention step 4-a) involves:

concentrating the 2MFR-b drying the 2MFR-b, or concentrating and subsequently drying the 2MFR-b.

The drying preferably provides the milk lipid composition in powder form. Any useful powder conversion process may be used, e.g. spray-drying or freeze drying. Spray-drying is particularly preferred. Suitable methods and details on implementation may e.g. be found in Westergaard, Milk Powder Technology—evaporation and spray drying, 5$^{th}$ edition, 2010, Gea Niro, Copenhagen.

It is furthermore preferred that the milk lipid composition, either in liquid, concentrated, or powder form, is packaged. The packaging may e.g. be performed under aseptic or sterile conditions and may e.g. involve filling and sealing the nutritional product into sterile containers.

The milk lipid composition is the 2MFR-b as such or, if step 4-b) is used, the concentrate or dried product resulting from step 4-b) In some preferred embodiments of the invention the milk lipid composition is in the form of a powder.

In other preferred embodiments of the invention the milk lipid composition is in the form of a liquid.

It is generally preferred to keep the temperature during the method as low as possible to avoid heat-damaging the milk lipid composition. The temperature of the liquid streams during the method is typically kept the in the range of 0-70 degrees C., preferably in the range of 2-40 degrees C.; even more preferred in the range of 4-15 degrees C., and most preferred in the range of 5-10 degrees C.

The pH of liquid feed and the liquid streams during the method is preferably in the range of 3-8, more preferably 4-7.5, even more preferably 4.5-7.0, and most preferably 5.0-7.0.

It is particularly preferred that the present method does not involve solvent extraction or fluid extraction, such as e.g. supercritical or near critical fluid extraction, prior to or during step 3).

It is even more preferred that the present method does not involve solvent extraction or fluid extraction, such as e.g. supercritical or near critical fluid extraction, at all.

The microfiltration steps of the present invention are preferably implemented as tangential flow filtration.

The method and methods variants of the present invention may be implemented as a batch method, a semi-batch method or a continuous method.

The inventors have seen indications that the present method provides cholesterol and other lipid species in a more native configuration than methods based on non-aqueous solvent/fluid extraction and at the same time provides a lipid products that is rich in cholesterol but has a favourable cholesterol:trans fatty acid ratio.

Yet an aspect of the invention pertains to a milk lipid composition, preferably derived from whey, comprising total cholesterol in an amount of 4-12% w/w relative to total lipid, and furthermore containing:

total lipid in an amount of 10-60% w/w relative to total solids, phospholipids in an amount of at least 40% w/w relative to total lipids, preferably, a weight ratio between cholesterol and trans-fatty acids of at least 2.0 total protein in an amount of 30-80% w/w relative to total solids, and the sum of total ALA, total BLG and CMP constitutes at most 70% w/w of total protein.

As said, the milk lipid composition is preferably derived from whey, and most preferably derived from whey without use of solvent extraction or fluid extraction. By solvent extraction is meant solvent extraction using e.g. ethanol or chloroform as extractants and by fluid extraction is meant e.g. near critical and super critical fluid extraction. It is particularly preferred that the milk lipid composition is derived from whey without any extraction processes.

Breastfeeding of infants is associated with lower blood cholesterol later in life (Ref. 4) and it has been argued that higher cholesterol and LDL-cholesterol levels in infancy is required for optimal cognitive development and programming of lipid metabolism later in life (Ref. 6). Human milk cholesterol levels ranges from 9.7-20.0 mg/100 mL (Refs. 1 and 2) whereas bovine infant formula cholesterol levels ranges from 1.5-5.1 mg/100 mL (Ref. 3). It is therefore desirable to increase the cholesterol level in infant formulas to obtain human milk levels.

In some preferred embodiments of the invention the milk lipid composition comprises total cholesterol in an amount of 4.5-11% w/w relative to total lipid, more preferably 5.0-10% w/w, and most preferably 5.5-8% w/w.

In other preferred embodiments of the invention the milk lipid composition comprises total cholesterol in an amount of 5-12% w/w relative to total lipid, more preferably 6-12% w/w, and most preferably 8-12% w/w.

In some preferred embodiments of the invention the milk lipid composition comprises total lipid in an amount of 10-60% w/w relative to total solids, more preferably 14-50% w/w, and most preferably 20-40% w/w.

In some preferred embodiments of the invention the milk lipid composition comprises phospholipid in an amount of at least 40% w/w relative to total lipids, more preferably at least 44% w/w, and most preferably in an amount of at least 46% w/w relative to total lipids.

In other preferred embodiments of the invention the milk lipid composition comprises phospholipid in an amount of 40-70% w/w relative to total lipids, more preferably 42-60% w/w relative to total lipids, and most preferably in an amount of 44-55% w/w relative to total lipids.

In some preferred embodiments of the invention the milk lipid composition comprises triacylglycerol (TAG) in an amount of at most 65% w/w relative to total lipids, more preferably at most 60% w/w, even more preferred at most 56% w/w relative to total lipids, and most preferably in an amount of at most 54% w/w relative to total lipids.

In other preferred embodiments of the invention the milk lipid composition comprises TAG in an amount of 30-65% w/w relative to total lipids, more preferably 40-60% w/w relative to total lipids, and most preferably in an amount of 45-56% w/w relative to total lipids.

In some preferred embodiments of the invention the milk lipid composition has a weight ratio between total cholesterol and trans-fatty acids of at least 2.0, more preferably at least 2.4, even more preferred at least 2.6, and most preferred at least 2.7.

In other preferred embodiments of the invention the milk lipid composition has a weight ratio between total cholesterol and trans-fatty acids in the range of 2.0-20, more preferably 2.4-15, even more preferred 2.6-10, and most preferred 2.7-6.

The content of trans fatty acids in infant formulas is restricted to a maximum of 3% of total fatty acids (EU Regulation EC 127/2016). Trans fatty acid consumption in infant is restricted due to the hazardous health risks related to increased risks of coronary heart disease and type 2 diabetes upon consumption of trans fatty acids. Cholesterol sources, such as cream, does not allow human cholesterol levels to be reached without violating the EU regulations for infant formulation. Usage of the novel milk lipid composition enables a favourable increase of cholesterol in an infant formula without concomitant increase in trans fatty acid content (high weight ratio of total cholesterol to trans-fatty acids).

In some preferred embodiments of the invention the milk lipid composition comprises sphingomyelin in an amount of at least 1.7% w/w relative to total solids, more preferably at least 2.0% w/w, even more preferred at least 2.4% w/w, and most preferably in an amount of at least 2.8% w/w relative to total solids.

In other preferred embodiments of the invention the milk lipid composition comprises sphingomyelin in an amount of at least 2.0% w/w relative to total solids, more preferably at least 2.5% w/w, even more preferred at least 2.7% w/w, and most preferably in an amount of at least 3.0% w/w relative to total solids.

In some preferred embodiments of the invention the milk lipid composition comprises sphingomyelin in an amount in the range of 1.7-6% w/w relative to total solids, more preferably 2.0-5.5% w/w, even more preferred 2.4-5% w/w, and most preferably in an amount of 2.8-4% w/w relative to total solids.

In some preferred embodiments of the invention the milk lipid composition comprises ganglioside GD3 in an amount of at least 180 mg/100 g solids, more preferably at least 200 mg/100 g solids, even more preferred at least 240 mg/100 g solids, and most preferably in an amount of at least 270 mg/100 g solids.

In other preferred embodiments of the invention the milk lipid composition comprises ganglioside GD3 in an amount of 180-600 mg/100 g solids, more preferably 200-500 mg/100 g solids, even more preferred 240-450 mg/100 g solids, and most preferably in an amount of 270-400 mg/100 g solids.

Higher levels of GD3 are sometimes preferred and in some preferred embodiments of the invention the milk lipid composition comprises ganglioside GD3 in an amount of 300-1000 mg/100 g solids, more preferably 400-900 mg/100 g solids, even more preferred 450-800 mg/100 g solids, and most preferably in an amount of 500-700 mg/100 g solids.

The milk lipid composition will often contain the ganglioside GM3 in addition to GD3 but normally in significantly lower contents. The GM3 content of the milk lipid composition is often at most 10% of the GD3 content, and typically at most approx. 5% of the GD3 content.

The balance between GD3 and GM3 may be shifted by contacting the milk lipid composition, or the feed from which it is prepared, with a sialidase enzyme which can cleave the terminal sialyl group from complex glycolipids and thereby converting GD3 to GM3.

Thus, in some preferred embodiments of the invention the milk lipid composition comprises the gangliosides GD3 and GM3 in a combined amount of at least 180 mg/100 g solids, more preferably at least 200 mg/100 g solids, even more preferred at least 240 mg/100 g solids, and most preferably in an amount of at least 270 mg/100 g solids.

The combined amount of GD3 and GM3 refers to the sum of the amounts of GM3 and GD3.

In other preferred embodiments of the invention the milk lipid composition comprises gangliosides GD3 and GM3 in a combined amount of 180-600 mg/100 g solids, more preferably 200-500 mg/100 g solids, even more preferred 240-450 mg/100 g solids, and most preferably in an amount of 270-400 mg/100 g solids.

Higher levels of GD3 and GM3 are sometimes preferred and in some preferred embodiments of the invention the milk lipid composition comprises the gangliosides GD3 and GM3 in a combined amount of 300-1000 mg/100 g solids, more preferably 400-900 mg/100 g solids, even more preferred 450-800 mg/100 g solids, and most preferably in an amount of 500-700 mg/100 g solids.

The quantifications of ganglioside content, phospholipid species, total cholesterol, and protein species are performed according to Example 2.

In some preferred embodiments of the invention the milk lipid composition comprises total protein in an amount of 40-75% w/w relative to total solids, more preferably 50-75% w/w, and most preferably 50-70% w/w relative to total solids.

In some preferred embodiments of the invention the milk lipid composition comprises total protein in an amount of 30-70% w/w relative to total solids, more preferably 35-65% w/w, and most preferably 40-60% w/w relative to total solids.

In other preferred embodiments of the invention the milk lipid composition comprises total protein in an amount of 40-80% w/w relative to total solids, more preferably 50-80% w/w, and most preferably 60-80% w/w relative to total solids.

In some preferred embodiments of the invention the sum of total ALA, total BLG and CMP of the the milk lipid composition constitutes at most 60% w/w of total protein, more preferably at most 60% w/w, even more preferably at most 55% w/w and most preferably at most 50% w/w of total protein.

In some preferred embodiments of the invention the milk lipid composition has a content of CMP of at most 3.0% w/w of total protein, more preferably at most 2% w/w, even more preferably at most 1% w/w, and most preferably at most 0.1% w/w.

In some preferred embodiments of the invention the content of carbohydrate relative to total solids of the milk lipid composition is at most 10% w/w, more preferably at most 5% w/w, even more preferably at most 2% w/w, and most preferably at most 0.5% w/w.

The milk lipid composition is preferably prepared by a method that does not involve solvent extraction, fluid extraction, or supercritical or near-critical fluid extraction.

The milk lipid composition of the present invention is preferably obtainable by the method described herein, preferably by method A. Alternatively, but also preferred, the milk lipid composition of the present invention may be obtainable by method B as described herein.

In some preferred embodiments of the invention the milk lipid composition comprises total solids in an amount of 5-40 g/100 g, more preferably 7-30 g/100 g, even more preferred 9-20 g/100 g, and most preferably 11-15 g/100 g. The non-solid part of such a milk lipid composition is preferably water.

In other preferred embodiments of the invention the milk lipid composition comprises total solids in an amount of 90-99 g/100 g, more preferably 91-98 g/100 g, even more preferred 92-97 g/100 g, and most preferably 93-96 g/100 g. Such a milk lipid composition is preferably powder product and preferably a powder suitable for use as an ingredient for infant nutrition, and preferably suitable for infant formulas.

The present milk lipid composition is preferably free of lipids not found in milk or whey. The present milk lipid composition is furthermore preferably free of protein not found in milk or whey.

Yet an aspect of the invention pertains to a nutritional composition comprising:

- the milk lipid composition as described herein or obtainable the method as described herein, and
- one or more additional food ingredients.

In some preferred embodiments of the invention the nutritional composition comprises at least one component that is not derivable from whey.

The one or more additional food ingredients typically comprise one or more of a vegetable oil, a carbohydrate-based hydrocolloid, a source of a poly-unsaturated fatty acid which is not found in bovine milk, a high intensity sweetener, a starch source, and a carbohydrate that is not found in bovine milk.

While other types of nutritional compositions are clearly feasible it is preferred that the nutritional composition is an infant formula, a follow-on formula, or a growing up formula.

The nutritional composition of the invention is particularly useful for providing high quality cholesterol to persons in nutritional need thereof without co-administration of undesirable trans-fatty acids.

The nutritional composition may furthermore be used for children, teenagers, or adult persons.

In some preferred embodiments of the invention the nutritional composition comprises total cholesterol in an amount of at least 50 mg/100 g total solids, more preferably at least 80 mg/100 g total solids, even more preferred at least 100 mg/100 g total solids, and most preferably at least 150 mg/100 g total solids.

In other preferred embodiments of the invention the nutritional composition comprises total cholesterol in an amount of 50-1000 mg/100 g total solids, more preferably 80-800 mg/100 g total solids, even more preferred 100-600 mg/100 g total solids, and most preferably 150-500 mg/100 g total solids.

In some preferred embodiments of the invention the nutritional composition comprises total cholesterol in an amount of at least 50 mg/L, more preferably at least 80 mg/L, even more preferred at least 100 mg/L, and most preferably at least 150 mg/L.

In other preferred embodiments of the invention the nutritional composition comprises total cholesterol in an amount of 50-1000 mg/L, more preferably 80-800 mg/L, even more preferred 100-600 mg/L, and most preferably 150-500 mg/L.

In further preferred embodiments of the invention the nutritional composition comprises total cholesterol in an amount of 80-300 mg/100 g total solids, more preferably 100-200 mg/100 g total solids, even more preferred 120-200 mg/100 g total solids, and most preferably 130-180 mg/100 g total solids.

In even further preferred embodiments of the invention the nutritional composition comprises total cholesterol in an amount of 80-300 mg/L, more preferably 100-200 mg/L, even more preferred 120-200 mg/L, and most preferably 130-180 mg/L.

In some preferred embodiments of the invention the milk lipid composition contributes with at least 20% w/w of total cholesterol of the nutritional composition, more preferably at least 40% w/w, even more preferred at least 60% w/w, and most preferred at least 80% w/w.

In other preferred embodiments of the invention the milk lipid composition contributes with 20-100% w/w of total cholesterol of the nutritional composition, more preferably 40-98% w/w, even more preferred 60-95% w/w, and most preferred 70-90% w/w.

In some preferred embodiments of the invention the nutritional composition comprises ganglioside GD3 in an amount of at least 2 mg/100 g total solids, more preferably at least 5 mg/100 g total solids, even more preferred at least 10 mg/100 g total solids, and most preferably at least 20 mg/100 g total solids.

In other preferred embodiments of the invention the nutritional composition comprises ganglioside GD3 in an amount of 2-100 mg/100 g total solids, more preferably 5-80 mg/100 g total solids, even more preferred 10-50 mg/100 g total solids, and most preferably 12-30 mg/100 g total solids.

In further preferred embodiments of the invention the nutritional composition comprises ganglioside GD3 in an amount of 2-50 mg/100 g total solids, more preferably 4-30 mg/100 g total solids, even more preferred 6-25 mg/100 g total solids, and most preferably 8-18 mg/100 g total solids.

In some preferred embodiments of the invention the milk lipid composition contributes with at least 20% w/w of the ganglioside GD3 of the nutritional composition, more preferably at least 40% w/w, even more preferred at least 60% w/w, and most preferred at least 80% w/w.

In some preferred embodiments of the invention the milk lipid composition contributes with 20-100% w/w of the ganglioside GD3 of the nutritional composition, more preferably 40-98% w/w, even more preferred 60-95% w/w, and most preferred 70-90% w/w.

The nutritional composition will often contain the ganglioside GM3 in addition to GD3 but normally in significantly lower contents. The GM3 content of the nutritional composition is often at most 10% of the GD3 content, and typically at most approx. 5% of the GD3 content.

In some preferred embodiments of the invention the nutritional composition comprises the gangliosides GM3 and GD3 in a combined amount of at least 2 mg/100 g total solids, more preferably at least 5 mg/100 g total solids, even more preferred at least 10 mg/100 g total solids, and most preferably at least 20 mg/100 g total solids.

In other preferred embodiments of the invention the nutritional composition comprises the ganglioside GM3 and GD3 in a combined amount of 2-100 mg/100 g total solids, more preferably 5-80 mg/100 g total solids, even more preferred 10-50 mg/100 g total solids, and most preferably 12-30 mg/100 g total solids.

In further preferred embodiments of the invention the nutritional composition comprises ganglioside GM3 and GD3 in a combined amount of 2-50 mg/100 g total solids, more preferably 4-30 mg/100 g total solids, even more preferred 6-25 mg/100 g total solids, and most preferably 8-18 mg/100 g total solids.

In some preferred embodiments of the invention the milk lipid composition contributes with at least 20% w/w of the combined amount of gangliosides GM3 and GD3 of the nutritional composition, more preferably at least 40% w/w, even more preferred at least 60% w/w, and most preferrably at least 80% w/w.

In some preferred embodiments of the invention the milk lipid composition contributes with 20-100% w/w of the combined amount of gangliosides GM3 and GD3 of the nutritional composition, more preferably 40-98% w/w, even more preferred 60-95% w/w, and most preferably 70-90% w/w.

In some preferred embodiments of the invention the nutritional composition comprises sphingomyelin in an amount of at least 25 mg/100 g total solids, more preferably at least 50 mg/100 g total solids, even more preferred at least 100 mg/100 g total solids, and most preferably at least 140 mg/100 g total solids.

In other preferred embodiments of the invention the nutritional composition comprises sphingomyelin in an amount of 25-500 mg/100 g total solids, more preferably 50-400 mg/100 g total solids, even more preferred 100-300 mg/100 g total solids, and most preferably 140-250 mg/100 g total solids.

In some preferred embodiments of the invention the milk lipid composition contributes with at least 20% w/w of the sphingomyelin of the nutritional composition, more preferably at least 40% w/w, even more preferred at least 60% w/w, and most preferred at least 80% w/w.

In some preferred embodiments of the invention the nutritional composition comprises PL in an amount of at least 50 mg/100 g total solids, more preferably at least 100 mg/100 g total solids, even more preferred at least 300 mg/100 g total solids, and most preferably at least 500 mg/100 g total solids.

In other preferred embodiments of the invention the nutritional composition comprises PL in an amount of 50-2000 mg/100 g total solids, more preferably 200-2000 mg/100 g total solids, even more preferred 400-2000 mg/100 g total solids, and most preferably 600-2000 mg/100 g total solids.

In some preferred embodiments of the invention the milk lipid composition contributes with at least 20% w/w of the PL of the nutritional composition, more preferably at least 40% w/w, even more preferred at least 60% w/w, and most preferred at least 80% w/w.

In some preferred embodiments of the invention the nutritional composition has a weight ratio between total cholesterol and trans-fatty acids of at least 2.0, more preferably at least 2.2, more preferably at least 2.4, even more preferred at least 2.6, and most preferred at least 2.7.

In other preferred embodiments of the invention the nutritional composition has a weight ratio between total cholesterol and trans-fatty acids in the range of 2.0-20, more preferably 2.4-15, even more preferred 2.6-10, and most preferred 2.7-6.

In some preferred embodiments of the invention the nutritional composition comprises total solids in an amount of 5-40 g/100 g, more preferably 7-30 g/100 g, even more preferred 9-20 g/100 g, and most preferably 11-15 g/100 g. The non-solid part of such a nutritional composition is preferably water. The nutritional composition may e.g. by a sterile ready-to-drink product, e.g. for infant nutrition.

In other preferred embodiments of the invention the nutritional composition comprises total solids in an amount of 90-99 g/100 g, more preferably 91-98 g/100 g, even more preferred 92-97 g/100 g, and most preferably 93-96 g/100 g. Such a nutritional composition is preferably powder product and preferably a powder for infant nutrition, such as e.g. an infant formula.

The nutritional composition with a low protein content relative to total calories often preferred in the context of infant nutrition. In some preferred embodiments of the invention the nutritional composition comprises total protein in an amount of at most 2.5 g/100 kcal, more preferably at most 2.0 g/100 kcal, even more preferred at most 1.8 g/100 kcal, and most preferably at most 1.6 g/100 kcal.

In other preferred embodiments of the invention the nutritional composition comprises total protein in an amount of 1.0-2.5 g/100 kcal, more preferably 1.1-2.0 g/100 kcal, even more preferred 1.2-1.8 g/100 kcal, and most preferably 1.3-1.6 g/100 kcal.

In some preferred embodiments of the invention the nutritional composition comprises the milk lipid composition described herein or obtainable by the present method in an amount of at least 0.1 g/100 g total solids, more preferably at least 0.5 g/100 g total solids, even more preferred at least 2 g/100 g total solids, and most preferably at least 3 g/100 g total solids.

In other preferred embodiments of the invention the nutritional composition comprises the milk lipid composition as described herein or obtainable according to the present method in an amount of 0.1-20 g/100 g total solids, more preferably 0.5-15 g/100 g total solids, even more preferred 2-10 g/100 g total solids, and most preferably 3-8 g/100 g total solids.

The nutritional composition may furthermore contain one or more of the ingredients described in WO 2017/220697 in the concentration and/or ratio described in WO 2017/220697. The one or more additional food ingredients used for preparing the nutritional composition may therefore be one or more of the ingredients described in WO 2017/220697 and may be used in the concentration and/or ratio described in WO 2017/220697.

The nutritional composition is preferably provided as a powder or as a liquid.

When provided as a liquid, it is preferred that the nutritional composition is a ready-to-drink beverage provided in a suitable container, preferably the nutritional composition is sterile. The sterility has preferably been obtained by heat-sterilization.

Nutritional composition typically has a pH in the range of 3-8, preferably 4-8, more preferably 5-7.5, and most preferably in the range of 6-7.5.

If the nutritional composition is an acidic nutritional composition, it preferably has a pH in the range of 3-5, more preferably 3.5-4.9, even more preferably 3.6-4.8, and most preferably in the range of 3.7-4.7.

If the nutritional composition is a powder or a solid product, the pH is measured as the pH of the mixture consisting of 10 g of the nutritional composition evenly dispersed in 90 g demineralised water.

Nutritional compositions that are nutritionally complete for children of 1-10 years of age are preferred and preferably have the compositional features described in the "COMMISSION DIRECTIVE 1999/21/EC of 25 Mar. 1999 on dietary foods for special medical purposes".

Nutritional compositions that are nutritionally complete for persons that are 11 years of age or older are also preferred and preferably have the compositional features described in the "COMMISSION DELEGATED REGULATION (EU) 2016/128—of 25 Sep. 2015—supplementing Regulation (EU) No 609/2013 of the European Parliament and of the Council as regards the specific compositional and information requirements for food for special medical purposes".

The nutritional composition typically has a solids content of 0.5-100% w/w depending on the form of the composition.

Solid nutritional compositions, preferably in the form of a powder, preferably have a solids content of 80-100 w/w, more preferably 90-99% w/w, even more preferably 92-98% w/w, and most preferably 93-97% w/w.

Liquid nutritional compositions, preferably in the form of a ready-to-drink beverage, preferably have a solids content of 0.5-50 w/w, more preferably 1-45% w/w, even more preferably 2-40% w/w, and most preferably 3-35% w/w.

The part of the nutritional composition that is not made up of solids preferably comprises water. The part of the nutritional composition that is not made up of solids preferably comprises water in an amount of at least 80% w/w, more preferably at least 90% w/w, even more preferably 95% w/w, and most preferably at least 99% w/w.

Preferably, the nutritional composition has a calorie content of 350-700 kcal/100 g total solids, more preferably 400-600 kcal/100 g total solids, even more preferred at least 425-575 kcal/100 g total solids, and most preferably 450-550 kcal/100 g total solids. These embodiments are preferred for e.g. infant formulas or clinical nutrition where the one or more protein sources are accompanied by substantial amounts of carbohydrate and lipid.

The nutritional composition typically comprises carbohydrates. The total carbohydrate content in the nutritional composition of the invention depends on the intended use of the nutritional composition.

The carbohydrate of the nutritional composition is preferably provided by one or more sources of carbohydrate.

Useful carbohydrate sources may be selected from the group consisting of: sucrose, maltose, dextrose, galactose, maltodextrin, corn syrup solids, sucromalt, glucose polymers, corn syrup, modified starches, resistant starches, rice-derived carbohydrates, isomaltulose, white sugar, glucose, fructose, lactose, high fructose corn syrup, honey, sugar alcohols, fructooligosaccharides, soy fiber, corn fiber, guar gum, konjac flour, polydextrose, fibersol, and combinations thereof. In some embodiments of the invention, the nutritional composition comprises non-digestible sugars like fructans, the fructan comprises inulin or fructooligosaccharides.

In some preferred embodiments of the invention, the nutritional composition comprises carbohydrates between 0 to 95% of the total energy content of the nutritional composition, more preferably in a range between 10 to 85% of the total energy content of the nutritional composition, even more preferably in a range between 20 to 75% of the total energy content of the nutritional composition, and most preferably in a range between 30 to 60% of the total energy content of the nutritional composition.

However, it is often preferred, e.g. in relation to clinical nutrition and/or nutritionally complete products, that the nutritional composition has a total content of carbohydrate in a range between 25-60% of the total energy content, more preferably 30-55 E %, and most preferably 35-50 E %.

The determination of the energy contribution of nutrients in a nutritional product is well-known to the skilled person, and involves calculating the energy contribution of each group of nutrients relative to the total energy content. For example, carbohydrate is known to contribute with 4.0 kcal/g carbohydrate, protein is known to contribute with 4.0 kcal/g protein, and fat is known to contribute with 9.0 kcal/g fat. The total energy content is determined by burning the composition in question in a bomb calorimeter.

In some preferred embodiments of the present invention, the nutritional composition is particularly useful as a sports nutrition and comprises e.g. a total content of carbohydrate of at most 75% of the total energy content (E %), more preferably at most 40 E %, even more preferably at most 10 E %, and most preferably at most 5 E %.

Even lower carbohydrate content is often preferred, thus in some preferred embodiments of the invention preferably in a range between 0 to 30% of the total energy content of the nutritional composition more preferably in a range between 0 to 20% of the total energy content of the nutritional composition even more preferably in a range between 0 to 10% of the total energy content of the nutritional composition.

In other preferred embodiments of the present invention, the nutritional composition is particularly useful as a nutritionally incomplete nutritional supplement and comprises a total content of carbohydrate in a range between 70-95% of the total energy content of (E %), more preferably 80-90 E %.

In some preferred embodiments of the present invention, the nutritional composition comprises a total content of carbohydrate in a range between 25-60% of the total energy content, more preferably 30-55 E %, and most preferably 35-50 E %. Such nutritional compositions are particularly useful for nutritionally complete nutritional compositions.

In some embodiments of the invention, the nutritional composition furthermore comprises at least one additional ingredient selected from the group consisting of vitamins, flavouring agents, minerals, sweeteners, antioxidants, food acid, lipids, carbohydrate, prebiotics, probiotics, and a combination thereof.

The additional ingredients can be used to adjust the nutrient contribution and the taste and flavour characteristics of the nutritional composition.

In one embodiment of the invention, the nutritional composition comprises at least one high-intensity sweetener (HIS). At least one HIS is preferably selected from the group consisting of aspartame, cyclamate, sucralose, acesulfame salt, neotame, saccharin, *stevia* extract, a steviol glycoside such as e.g. rebaudioside A, or a combination thereof.

In some embodiments of the invention, it is particularly preferred that the sweetener comprises or even consists of one or more high-intensity sweeteners.

HIS is both found among both natural and artificial sweeteners and typically have a sweetening intensity of at least 10 times that of sucrose.

If used, the total content of HIS of the nutritional composition is typically in the range of 0.001-2% w/w. Preferably, the total content of HIS is in the range of 0.005-1% w/w. Most preferably, the total content of HIS is in the range of 0.01-0.5% w/w.

The choice of the sweetener may depend on the nutritional composition to be produced, e.g. high-intensity sweeteners (e.g. aspartame, acesulfame-K or sucralose) may be used in nutritional composition where no energy contribution from the sweetener is desired, whereas for nutritional composition having a natural profile natural sweeteners (e.g. steviol glycosides, sorbitol or sucrose) may be used.

It may furthermore be preferred that the sweetener comprises or even consists of one or more polyol sweetener(s). Non-limiting examples of useful polyol sweeteners are maltitol, mannitol, lactitol, sorbitol, inositol, xylitol, threitol, galactitol or combinations thereof. If used, the total content of polyol sweetener of the nutritional composition is typically in the range of 1-20% w/w. More preferably the total content of polyol sweetener of the nutritional composition is in the range of 2-15% w/w. Even more preferably, the total content of polyol sweetener may be in the range of 4-10% w/w.

In some preferred embodiments of the invention, which are particularly suitable to low carbohydrate or carbohydrate-free products, the nutritional composition comprises:

- a total content of carbohydrate of at most 1% w/w, more preferably at most 0.5% w/w, and most preferably at most 0.1% w/w, and
- a total content of HIS in the range of 0.001-2% w/w, more preferably in the range of 0.005-1% w/w, and most preferably in the range of 0.01-0.5% w/w.

In some embodiments of the invention, the nutritional composition furthermore comprises lipids. The total lipid content in the nutritional composition of the invention depends on the intended use of the nutritional composition.

In some preferred embodiments of the invention, the nutritional composition has a lipid content between 0 to 50% of the total energy content of the nutritional composition, or preferably in a range between 0 to 40% of the total energy content of the nutritional composition, or preferably in a range between 0 to 30% of the total energy content of the nutritional composition or preferably in a range between 0 to 20% of the total energy content of the nutritional composition or preferably in a range between 0 to 10% of the total energy content of the nutritional composition or preferably in a range between 0 to 5% of the total energy content of the nutritional composition.

In some preferred embodiments of the present invention, the nutritional composition comprises a total content of lipid of at most 10 E %, more preferably at most 5 E %, and most preferably at most 1 E %.

In some preferred embodiments of the present invention, the nutritional composition is particularly useful as a nutritionally incomplete nutritional supplement and comprises e.g. a total content of lipid of at most 10% of the total energy content of the nutritional composition, preferably at most 1 E %.

In some preferred embodiments of the present invention, the nutritional composition, e.g. in the form of a sports nutritional composition, has:

- a total content of protein of 10-99% of the total energy content of the nutritional composition (E %), more preferably 20-98 E %, even more preferably 50-97 E %, and most preferably at most 80-96 E %,
- a total content of carbohydrate of at most 75% of the total energy content of the nutritional composition (E %), more preferably at most 40 E %, even more preferably at most 10 E %, and most preferably at most 5 E %, and
- a total content of lipid of 1-10 E %, more preferably 2-10 E %, even more preferably 3-10 E %, and most preferably 4-10 E %.

It is particularly preferred that:

- the nutritional composition comprises total cholesterol in an amount of at least 10 mg/100 g total solids, more preferably at least 50 mg/100 g total solids, even more preferably at least 80 mg/100 g total solids, even more preferred at least 100 mg/100 g total solids, and most preferably at least 150 mg/100 g total solids, and
- the milk lipid composition of the invention contributes with at least 20% w/w of total cholesterol of the nutritional composition, more preferably at least 40% w/w, even more preferred at least 60% w/w, and most preferably at least 80% w/w, and
- the nutritional composition having a weight ratio between total cholesterol and trans-fatty acids of at least 2.0, more preferably at least 2.2, more preferably at least 2.4, even more preferred at least 2.6, and most preferably at least 2.7.

Even more preferably:

- the nutritional composition comprises total cholesterol in an amount 10-1000 mg/100 g total solids, more preferably 50-1000 mg/100 g total solids, even more preferably 80-800 mg/100 g total solids, even more preferred 100-600 mg/100 g total solids, and most preferably 150-500 mg/100 g total solids, and
- the milk lipid composition of the invention contributes with at least 20% w/w of total cholesterol of the nutritional composition, more preferably at least 40% w/w, even more preferred at least 60% w/w, and most preferred at least 80% w/w, and
- the nutritional composition having a weight ratio between total cholesterol and trans-fatty acids of at least 2.0, more preferably at least 2.2, more preferably at least 2.4, even more preferred at least 2.6, and most preferred at least 2.7.

In other preferred embodiments of the present invention, the nutritional composition, e.g. in the form of a nutritionally complete nutritional composition, comprises:

- a total content of protein in the range of 10-45% of the total energy content of the nutritional composition (E %), more preferably 12-40 E %, and most preferably at most 15-35 E %,
- a total content of carbohydrate in a range between 25-60% of the total energy content of the nutritional composition, more preferably 30-55 E %, and most preferably in a range between 35-50 E % and
- a total content of lipid in the range of 20-50% of the total energy content, more preferably in a range between 25-45 E %, and most preferably 30-40 E %.

In some preferred embodiments of the present invention, the nutritional composition, e.g. in the form of a sports nutritional composition, comprises:

a total content of carbohydrate of at most 75% of the total energy content (E %) of the nutritional composition, more preferably at most 40 E %, even more preferably at most 10 E %, even more preferably at most 5 E %, and most preferably at most 1 E %, and a total content of lipid of 1-10 E %, more preferably 2-10 E %, even more preferably 3-10 E %, and most preferred 4-10 E %.

In other preferred embodiments of the present invention, the nutritional composition, e.g. in the form of a nutritionally complete nutritional composition, comprises:

a total content of carbohydrate in a range between 25-60% of the total energy content, more preferably 30-55 E %, and most preferably 35-50 E % and a total content of lipid in the range of 20-50% of the total energy content, more preferably 25-45 E %, and most preferably 30-40 E %.

In a more narrow aspect of the invention the nutritional composition is a beverage, and preferably a heat-treated, and more preferably heat-sterilized, beverage.

The heat-treated beverage preferably has a pH of 3.0-8.5. The heat-treated beverage is preferably either a near-pH neutral beverage or an acidic beverage.

In some preferred embodiments of the invention the heat-treated beverage preferably has a pH of 5.5-8.5, more preferably of 6.0-8.0, even more preferably 6.3-7.5, and most preferably 6.5-7.5.

For acidic beverages is it preferred that the heat-treated beverage preferably has a pH in the range of 3.0 to less than 5.5, more preferably of 3.2-5.0, even more preferably 3.4-4.7, and most preferably 3.5-4.5.

It is particularly preferred that the heat-treated beverage is sterile, and preferably that it has been heat-sterilized.

The heat-treated beverage is preferably a packaged, heat-treated beverage and is preferably packaged in a closed container, such as e.g. a bottle. Such packaged, heat-treated beverages are highly preferred by the consumers and typically have both a long shelf-life at ambient temperature and can be transported and ingested where the consumer desires.

In some preferred embodiments of the present invention, the heat-treated beverage has a shelf-life at an ambient temperature of at least 6 months, more preferably at least 1 year, and even more preferably at least 2 years.

The heat-treated beverage preferably comprises a total amount of protein in the range of 0.5-25% w/w relative to the weight of the beverage, more preferably 1-20% w/w relative to the weight of the beverage, even more preferably 2-15% w/w relative to the weight of the beverage, and most preferably 3-10% w/w relative to the weight of the beverage.

Alternatively, but also preferred, the heat-treated beverage may comprise a total amount of protein in the range of 4-15% w/w relative to the weight of the heat-treated beverage, more preferably 5-14% w/w relative to the weight of the heat-treated beverage, even more preferably 6-13% w/w relative to the weight of the liquid mixture, and most preferably 8-12% w/w relative to the weight of the heat-treated beverage.

In some preferred embodiments of the present invention, the heat-treated beverage preferably comprises total protein in an amount of at least 15% w/w relative to total solids, more preferably at least 20% w/w, and most preferably at least 25% w/w, and most preferably at least 30% w/w relative to total solids. The lower end of these ranges are particularly preferred for beverages for clinical nutrition which often contain significant amounts of fat and carbohydrate in addition to protein.

The total protein may contribute with an even larger portion of the total solids, e.g. when the beverage is intended as a sports protein beverage. Thus, in some preferred embodiments of the present invention, the heat-treated beverage comprises total protein in an amount of at least 80% w/w relative to total solids, more preferably at least 90% w/w, even more preferably at least 92% w/w, and most preferably at least 94% w/w relative to total solids.

The heat-treated beverage preferably has a solids content of 0.5-50% w/w, more preferably 1-35% w/w, even more preferably 2-20% w/w, and most preferably 3-10% w/w.

The part of the heat-treated beverage that is not made up of solids preferably comprises water.

The part of the heat-treated beverage that is not made up of solids preferably comprises water in an amount of at least 80% w/w, more preferably at least 90% w/w, even more preferably 95% w/w, and more preferably at least 99% w/w.

In some preferred embodiments of the present invention, the heat-treated beverage has a calorie content of at most 100 kcal/100 g, more preferably at most 80 kcal/100 g, even more preferred at most 70 kcal/100 g, and most preferably at most 60 kcal/100 g. Preferably, the heat-treated beverage may have a calorie content of 2-100 kcal/100 g, more preferably at 4-80 kcal/100 g, even more preferred 8-70 kcal/100 g, and most preferably 12-60 kcal/100 g. These embodiments are preferred e.g. for sports applications where the protein source is a primary energy source.

In other preferred embodiments of the present invention, the heat-treated beverage has a calorie content of more than 100 kcal/100 g, more preferably at least 120 kcal/100 g, even more preferred at least 140 kcal/100 g, and most preferably at least 150 kcal/100 g. Preferably, the heat-treated beverage may have a calorie content of 101-300 kcal/100 g, more preferably at 120-280 kcal/100 g, even more preferred 140-270 kcal/100 g, and most preferably 150-260 kcal/100 g. These embodiments are preferred for e.g. clinical nutrition where the protein source is accompanied by substantial amounts of carbohydrate and fat.

The heat-treated beverage of the present invention may comprise other macronutrients than proteins, such as e.g. carbohydrate and/or lipid.

In some embodiments of the invention, the heat-treated beverage furthermore comprises carbohydrates. The total carbohydrate content in the heat-treated beverage of the invention depends on the intended use of the heat-treated beverage.

The carbohydrate of the packaged heat-treated beverage is preferably provided by one or more sources of carbohydrate.

Useful carbohydrate sources may be selected from the group consisting of: sucrose, maltose, dextrose, galactose, maltodextrin, corn syrup solids, sucromalt, glucose polymers, corn syrup, modified starches, resistant starches, rice-derived carbohydrates, isomaltulose, white sugar, glucose, fructose, lactose, high fructose corn syrup, honey, sugar alcohols, fructooligosaccharides, soy fiber, corn fiber, guar gum, konjac flour, polydextrose, fibersol, and combinations thereof. In some embodiments of the invention, the packaged heat-treated beverage comprises non-digestible sugars like fructans, the fructan comprises inulin or fructooligosaccharides.

In some preferred embodiments of the invention, the heat-treated beverage comprises carbohydrates between 0 to 95% of the total energy content of the beverage, more preferably in a range between 10 to 85% of the total energy content of the beverage, even more preferably in a range between 20 to 75% of the total energy content of the beverage, and most preferably in a range between 30 to 60% of the total energy content of the beverage.

Even lower carbohydrate content is often preferred, thus in some preferred embodiments of the invention preferably in a range between 0 to 30% of the total energy content of the beverage more preferably in a range between 0 to 20% of the total energy content of the beverage even more preferably in a range between 0 to 10% of the total energy content of the beverage.

In some preferred embodiments of the present invention, the beverage is particularly useful as a sports beverage and comprises e.g. a total content of carbohydrate of at most 75% of the total energy content of the beverage (E %), more preferably at most 40 E %, even more preferably at most 10 E %, and most preferably at most 5 E %.

In some preferred embodiments of the present invention, the packaged heat-treated beverage is particularly useful as a nutritionally incomplete nutritional supplement and comprises e.g. a total amount of carbohydrate in a range between 70-95% of the total energy content of the beverage (E %), preferably 80-90 E %.

In some preferred embodiments of the present invention, the heat-treated beverage comprises a total amount of carbohydrate in a range between 25-60% of the total energy content of the beverage, more preferably 30-55 E %, and most preferably 35-50 E %. Such beverages are particularly useful for nutritionally complete beverages.

In some embodiments of the invention, the heat-treated beverage furthermore comprises at least one additional ingredient selected from the group consisting of vitamins, flavouring agents, minerals, sweeteners, antioxidants, food acid, lipids, carbohydrate, prebiotics, probiotics, and a combination thereof.

The additional ingredients can be used to adjust the nutrient contribution and the taste and flavour characteristics of the beverage.

In one embodiment of the invention, the beverage comprises at least one high-intensity sweetener (HIS). At least one HIS is preferably selected from the group consisting of aspartame, cyclamate, sucralose, acesulfame salt, neotame, saccharin, *stevia* extract, a steviol glycoside such as e.g. rebaudioside A, or a combination thereof.

In some embodiments of the invention, it is particularly preferred that the sweetener comprises or even consists of one or more high-intensity sweeteners.

HIS is both found among both natural and artificial sweeteners and typically has a sweetening intensity of at least 10 times that of sucrose.

If used, the total content of HIS of the beverage is typically in the range of 0.001-2% w/w. Preferably, the total content of HIS is in the range of 0.005-1% w/w. Most preferably, the total content of HIS is in the range of 0.01-0.5% w/w.

The choice of the sweetener may depend on the beverage to be produced, e.g. high-intensity sweeteners (e.g. aspartame, acesulfame-K or sucralose) may be used in beverages where no energy contribution from the sweetener is desired, whereas for beverages having a natural profile natural sweeteners (e.g. steviol glycosides, sorbitol or sucrose) may be used.

It may furthermore be preferred that the sweetener comprises or even consists of one or more polyol sweetener(s). Non-limiting examples of useful polyol sweeteners are maltitol, mannitol, lactitol, sorbitol, inositol, xylitol, threitol, galactitol or combinations thereof. If used, the total content of polyol sweetener of the beverage is typically in the range of 1-20% w/w. More preferably the total content of polyol sweetener of the beverage is in the range of 2-15% w/w. Even more preferably, the total content of polyol sweetener may be in the range of 4-10% w/w.

In some preferred embodiments of the invention, the heat-treated beverage comprises:

- a total content of carbohydrate of at most 1% w/w, more preferably at most 0.5% w/w, and most preferably at most 0.1% w/w, and
- a total content of HIS in the range of 0.001-2% w/w, more preferably in the range of 0.005-1% w/w, and most preferably in the range of 0.01-0.5% w/w.

In some embodiments of the invention, the heat-treated beverage furthermore comprises lipids. The total lipid content in the heat-treated beverage of the invention depends on the intended use of the heat-treated beverage.

In some preferred embodiments of the present invention, the beverage comprises a total content of lipid of at most 10 E %, more preferably at most 5 E %, and most preferably at most 1 E %.

In some preferred embodiments of the present invention, the heat-treated beverage is particularly useful as a nutritionally incomplete nutritional supplement and comprises e.g. a total content of lipid of at most 10% of the total energy content of the beverage, preferably at most 1 E %.

However, it is often preferred, e.g. in relation to clinical nutrition and/or nutritionally complete products, that the heat-treated beverage has a total content of lipid in the range of 20-50% of the total energy content, more preferably 25-45 E %, and most preferably 30-40 E %.

However, it is often preferred, e.g. in relation to clinical nutrition and/or nutritionally complete products, that the heat-treated beverage has a total content of carbohydrate in a range between 25-60% of the total energy content, more preferably 30-55 E %, and most preferably 35-50 E %.

In some preferred embodiments of the present invention, the heat-treated beverage has a viscosity of at most 200 cP at 20 degrees C. and at a shear rate of 300 $s^{-1}$, more preferably at most 100 cP at 20 degrees C. and at a shear rate of 300 $s^{-1}$, even more preferred at most 50 cP at 20 degrees C. and at a shear rate of 300 $s^{-1}$, and most preferred at most 20 cP at 20 degrees C. and at a shear rate of 300 $s^{-1}$.

In some preferred embodiments of the present invention, the beverage, e.g. in the form of a sports beverage, comprises:

- a total amount of protein in the range of 0.5-25% w/w relative to the weight of the beverage, more preferably 1-20% w/w relative to the weight of the beverage, even more preferably 2-15% w/w relative to the weight of the beverage, and most preferably 3-10% w/w relative to the weight of the beverage,
- a total content of carbohydrate of at most 75% of the total energy content of the beverage (E %), more preferably at most 40 E %, even more preferably at most 10 E %, and most preferably at most 5 E %, and
- a total content of lipid of 1-10 E %, more preferably 2-10 E %, even more preferably 3-10 E %, and most preferably 4-10 E %.

In other preferred embodiments of the present invention, the packaged heat-treated beverage, e.g. in the form of a nutritionally complete beverage, comprises:

- a total amount of protein in the range of 0.5-25% w/w relative to the weight of the beverage, more preferably 1-20% w/w relative to the weight of the beverage, even more preferably 2-15% w/w relative to the weight of the beverage, and most preferably 3-10% w/w relative to the weight of the beverage, a total content of carbohydrate in a range between 25-60% of the total energy content of the beverage, more preferably 30-55 E %, and most preferably in a range between 35-50 E % and a total content of lipid in the range of 20-50% of the total energy content, more preferably in a range between 25-45 E %, and most preferably 30-40 E %.

In some preferred embodiments of the present invention, the heat-treated beverage has a pH in the range of 6.2-7.5, most preferably 6.8-7.5, and comprises:

a total amount of protein in the range of 0.5-25% w/w relative to the weight of the beverage, more preferably 1-20% w/w relative to the weight of the beverage, even more preferably 2-15% w/w relative to the weight of the beverage, and most preferably 3-10% w/w relative to the weight of the beverage, and wherein protein from the milk lipid composition provides at least 50% w/w of the total protein of the heat-treated beverage, more preferably at least 70% w/w, even more preferably at least 90% w/w, and most preferably 100% w/w of the total protein of the heat-treated beverage.

In other preferred embodiments of the present invention, the heat-treated beverage has a pH in the range of 6.2-7.5, most preferably 6.8-7.5, and comprises:

a total amount of protein in the range of 4-15% w/w relative to the weight of the beverage, more preferably 5-14% w/w relative to the weight of the beverage, even more preferably 6-13% w/w relative to the weight of the beverage, and most preferably 8-12% w/w relative to the weight of the beverage, and wherein protein from the milk lipid composition provides at least 50% w/w of the total protein of the heat-treated beverage, more preferably at least 70% w/w, even more preferably at least 90% w/w, and most preferably 100% w/w of the total protein of the heat-treated beverage.

The contents of the carbohydrates and fat of the heat-treated beverage may vary and depend on the application.

In some preferred embodiments of the present invention, the heat-treated beverage, e.g. in the form of a sports beverage, comprises:

a total content of carbohydrate of at most 75% of the total energy content (E %) of the beverage, more preferably at most 40 E %, even more preferably at most 10 E %, even more preferably at most 5 E %, and most preferably at most 1 E %, and a total content of lipid of 1-10 E %, more preferably 2-10 E %, even more preferably 3-10 E %, and most preferred 4-10 E %.

In other preferred embodiments of the present invention, the packaged heat-treated beverage, e.g. in the form of a nutritionally complete beverage, comprises:

a total content of carbohydrate in a range between 25-60% of the total energy content of the beverage, more preferably 30-55 E %, and most preferably in a range between 35-50 E % and a total content of lipid in the range of 20-50% of the total energy content, more preferably in a range between 25-45 E %, and most preferably 30-40 E %.

In some preferred embodiments of the invention the nutritional composition comprises:

the milk lipid composition according to the invention or obtainable according to the method of the invention, the milk lipid composition contributing with at least 20% w/w of total cholesterol of the nutritional composition, and one or more additional food ingredients, the nutritional composition comprising total cholesterol in an amount of at least 10 mg/100 g total solids, more preferably at least 50 mg/100 g total solids, more preferably at least 80 mg/100 g total solids, even more preferred at least 100 mg/100 g total solids, and most preferably at least 150 mg/100 g total solids, and the nutritional composition having a weight ratio between total cholesterol and trans-fatty acids of at least 2.0.

Preferably, the nutritional composition furthermore comprises at least one component that is not derivable from whey.

The nutritional composition preferably comprises total cholesterol in an amount of 10-1000 mg/100 g total solids, more preferably 50-800 mg/100 g total solids, more preferably 80-800 mg/100 g total solids, even more preferred 100-600 mg/100 g total solids, and most preferably 150-500 mg/100 g total solids.

Alternatively, but also preferred, the nutritional composition may comprises total cholesterol in an amount of 100-600 mg/100 g total.

In some preferred embodiments of the invention the nutritional composition is an infant formula, preferably in the form of a powder or a ready-to-drink beverage, and comprises total protein in an amount of 1.2-1.8 g/100 kcal, and most preferably 1.3-1.6 g/100 kcal, total cholesterol in an amount 120-200 mg/100 g total solids, and most preferably 130-180 mg/100 g total solids, ganglioside GD3 in an amount of 10-50 mg/100 g total solids, and most preferably 12-30 mg/100 g total solids, sphingomyelin in an amount of 100-300 mg/100 g total solids, and most preferably 140-250 mg/100 g total solids, and PL in an amount of 400-2000 mg/100 g total solids, and most preferably 600-2000 mg/100 g total solids, the nutritional composition having a weight ratio between total cholesterol and trans-fatty acids of at least 2.0, more preferably at least 2.2, more preferably at least 2.4, even more preferred at least 2.6, and most preferred at least 2.7.

In other preferred embodiments of the invention the nutritional composition is an infant formula and comprises total protein in an amount of 1.2-1.8 g/100 kcal, and most preferably 1.3-1.6 g/100 kcal, total cholesterol in an amount 120-200 mg/100 g total solids, and most preferably 130-180 mg/100 g total solids, ganglioside GD3 in an amount of 10-50 mg/100 g total solids, and most preferably 12-30 mg/100 g total solids, sphingomyelin in an amount of 100-300 mg/100 g total solids, and most preferably 140-250 mg/100 g total solids, and PL in an amount of 400-2000 mg/100 g total solids, and most preferably 600-2000 mg/100 g total solids, and wherein the milk lipid composition contributes with at least 20% w/w of total cholesterol of the nutritional composition, more preferably at least 40% w/w, even more preferred at least 60% w/w, and most preferred at least 80% w/w.

In further preferred embodiments of the invention the nutritional composition is an infant formula and comprises total protein in an amount of 1.2-1.8 g/100 kcal, and most preferably 1.3-1.6 g/100 kcal, total cholesterol in an amount 120-200 mg/100 g total solids, and most preferably 130-180 mg/100 g total solids, ganglioside GD3 in an amount of 10-50 mg/100 g total solids, and most preferably 12-30 mg/100 g total solids, sphingomyelin in an amount of 100-300 mg/100 g total solids, and most preferably 140-250 mg/100 g total solids, and PL in an amount of 400-2000 mg/100 g total solids, and most preferably 600-2000 mg/100 g total solids, the nutritional composition having a weight ratio between total cholesterol and trans-fatty acids of at least 2.0, more preferably at least 2.2, more preferably at least 2.4, even more preferred at least 2.6, and most preferred at least 2.7, and wherein the milk lipid composition contributes with at least 20% w/w of total cholesterol of the nutritional composition, more preferably at least 40% w/w, even more preferred at least 60% w/w, and most preferred at least 80% w/w.

In some preferred embodiments of the invention the nutritional composition is an infant formula, preferably in the form of a powder or a ready-to-drink beverage, and comprises total protein in an amount of 1.2-1.8 g/100 kcal, and most preferably 1.3-1.6 g/100 kcal, total cholesterol in an amount 50-200 mg/100 g total solids, and most preferably 80-180 mg/100 g total solids, ganglioside GD3 in an amount of 10-50 mg/100 g total solids, and most preferably 12-30 mg/100 g total solids, sphingomyelin in an amount of 100-300 mg/100 g total solids, and most preferably 140-250 mg/100 g total solids, and PL in an amount of 400-2000 mg/100 g total solids, and most preferably 600-2000 mg/100 g total solids, the nutritional composition having a weight ratio between total cholesterol and trans-fatty acids of at least 2.0, more preferably at least 2.2, more preferably at least 2.4, even more preferred at least 2.6, and most preferred at least 2.7.

In other preferred embodiments of the invention the nutritional composition is an infant formula and comprises total protein in an amount of 1.2-1.8 g/100 kcal, and most preferably 1.3-1.6 g/100 kcal, total cholesterol in an amount 50-200 mg/100 g total solids, and most preferably 80-180 mg/100 g total solids, ganglioside GD3 in an amount of 10-50 mg/100 g total solids, and most preferably 12-30 mg/100 g total solids, sphingomyelin in an amount of 100-300 mg/100 g total solids, and most preferably 140-250 mg/100 g total solids, and PL in an amount of 400-2000 mg/100 g total solids, and most preferably 600-2000 mg/100 g total solids, and wherein the milk lipid composition contributes with at least 20% w/w of total cholesterol of the nutritional composition, more preferably at least 40% w/w, even more preferred at least 60% w/w, and most preferred at least 80% w/w.

In further preferred embodiments of the invention the nutritional composition is an infant formula and comprises total protein in an amount of 1.2-1.8 g/100 kcal, and most preferably 1.3-1.6 g/100 kcal, total cholesterol in an amount 50-200 mg/100 g total solids, and most preferably 80-180 mg/100 g total solids, ganglioside GD3 in an amount of 10-50 mg/100 g total solids, and most preferably 12-30 mg/100 g total solids, sphingomyelin in an amount of 100-300 mg/100 g total solids, and most preferably 140-250 mg/100 g total solids, and PL in an amount of 400-2000 mg/100 g total solids, and most preferably 600-2000 mg/100 g total solids, the nutritional composition having a weight ratio between total cholesterol and trans-fatty acids of at least 2.0, more preferably at least 2.2, more preferably at least 2.4, even more preferred at least 2.6, and most preferred at least 2.7, and wherein the milk lipid composition contributes with at least 20% w/w of total cholesterol of the nutritional composition, more preferably at least 40% w/w, even more preferred at least 60% w/w, and most preferred at least 80% w/w.

Yet an aspect of the invention pertains to a process of producing a nutritional composition, preferably the nutritional composition described herein comprising the steps of:

i) providing a milk lipid composition as described herein or obtainable by the present method, ii) combining the milk lipid composition with one or more additional food ingredients and, optionally, further processing to the combination.

A further aspect of the invention pertains to the use of the milk lipid composition as defined herein or obtainable by the present method in the production of a nutritional product, preferably an infant formula, and preferably using the milk lipid composition:

for increasing the content of one or more of:

cholesterol, phospholipid, sphingomyelin, and ganglioside, or for reducing the content of trans fatty acids, preferably relative to total cholesterol, total lipid or total phospholipid, of the nutritional composition.

The nutritional composition of the use is preferably the nutritional composition as described herein.

Some preferred, numbered embodiments of the invention are presented in the following.

Numbered embodiment 1. A method of preparing a milk lipid composition comprising total cholesterol in an amount of 4-12% w/w relative to total lipid and comprising total lipid in an amount of 10-60% w/w relative to total solids, the method comprising the steps of:

1) providing a whey from mammal milk, and optionally subjecting the whey to one or more steps of removal of particles larger than 0.8 micron, concentration, dilution, and pH adjustment to obtain a pH in the range of 3-8, thereby providing a liquid feed having a pH in the range of 3-8, 2-a) subjecting the liquid feed to a first microfiltration step (1MF-a) thereby providing a first MF retentate (1MFR-a) and a first MF permeate (1MFP-a), wherein 1MF-a preferably is operated to provide a 1MFR-a having a particle mode size of at least 200 nm and/or a 1MFP-a having a particle mode size of at most 190 nm, 3-a) subjecting the 1MFP-a or a concentrate or dilution thereof to a second MF step (2MF-a) to provide a second MF retentate (2MFR-a) and a second MF permeate (2MFP-a), wherein particles of larger hydrodynamic diameter are transferred to the permeate during 1MF-a than during 2MF-a, and wherein 2MF-a preferably is operated to provide a 2MFR-a having a particle mode size of at least 165 nm and/or a 2MFP-a having a particle mode size of at less than 165 nm, 4-a) optionally, concentrating and/or drying the 2MFR-a, and preferably, wherein the MF membranes and conditions used during 1MF-a and 2MF-a provide a 2MFR-a that has a content of native BLG of at most 40% relative to total protein, and wherein the milk lipid composition is the 2MFR-a or, if step 4-a) is used, the concentrate or dried product resulting from step 4-a).

Numbered embodiment 2. A method of preparing a milk lipid composition comprising total cholesterol in an amount of 4-12% w/w relative to total lipid and comprising total lipid in an amount of 10-60% w/w relative to total solids, the method comprising the steps of:

1) providing a whey from mammal milk, and optionally subjecting the whey to one or more steps of removal of particles larger than 0.8 micron, concentration, dilution, and pH adjustment to obtain a pH in the range of 3-8, thereby providing a liquid feed having a pH in the range of 3-8, 2-b) subjecting the liquid feed to a first microfiltration step (1MF-b) thereby providing a first MF retentate (1MFR-b) and a first MF permeate (1MFP-b), wherein 1MF-b preferably is operated to provide a 1MFR-b having a particle mode size of at least 150 nm and/or a 1MFP-b having a particle mode size of less than 200 nm, 3-b) subjecting the 1MFR-b or a concentrate or dilution thereof to a second MF step (2MF-b) to provide a second MF retentate (2MFR-b) and a second MF permeate (2MFP-b), and wherein particles of larger hydrodynamic diameter are transferred to the permeate during 2MF-b than during the 1MF-b, and wherein 2MF-b preferably is operated to provide a 2MFR-b having a particle mode size of at least 200 nm and/or a 2MFP-b having a particle mode size of at most 300 nm, 4-b) optionally, concentrating and/or drying the 2MFR-b, and preferably, wherein the MF membranes and conditions used during 1MF-b and 2MF-b provide a 2MFP-b that has a content of native BLG of at most 40% relative to total protein, and wherein the milk lipid composition is the 2MFP-b or, if step 4-b) is used, the concentrate or dried product resulting from step 4-b).

Numbered embodiment 3. The method according to numbered embodiment 1 or 2 wherein the mammal milk has a total lipid content of at most 1% w/w, more preferably at most 0.5% w/w, even more preferably at most 0.10% w/w and most preferably at most 0.08% w/w.

Numbered embodiment 4. The method according to any of the preceding numbered embodiments wherein the mammal milk is skim milk.

Numbered embodiment 5. The method according to any of the preceding numbered embodiments wherein the mammal milk comprises or even consist of milk from one or more of the following mammals: human, cow, goat, sheep, mare, camel, yak, and buffalo.

Numbered embodiment 6. The method according to any of the preceding numbered embodiments wherein the mammal milk comprises or even consist of bovine milk.

Numbered embodiment 7. The method according to any of the preceding numbered embodiments wherein the mammal milk has a degree of whey protein denaturation of at most 30%, more preferably at most 20%, even more preferably at most 15%, and most preferably at most 10%.

Numbered embodiment 8. The method according to any of the preceding numbered embodiments wherein the preparation of the whey involves acidification of the milk and subsequent precipitation of casein and removal of the precipitated casein.

Numbered embodiment 9. The method according to any of the preceding numbered embodiments wherein the preparation of the whey involves addition of protease enzyme, pref. rennet, to the milk and subsequent precipitation of casein and removal of the precipitated casein.

Numbered embodiment 10. The method according to any of the preceding numbered embodiments wherein the whey has a degree of BLG protein denaturation of at most 30%, more preferably at most 20%, even more preferably at most 15%, and most preferably at most 10%.

Numbered embodiment 11. The method according to any of the preceding numbered embodiments wherein the liquid feed is the whey as such.

Numbered embodiment 12. The method according to any of the preceding numbered embodiments wherein the provision of the liquid feed involves removal of particles larger than 0.8 micron.

Numbered embodiment 13. The method according to any of the preceding numbered embodiments wherein the provision of the liquid feed involves concentration of the whey or a product stream derived from the whey, e.g. by one or more of UF, NF, RO and evaporation.

Numbered embodiment 14. The method according to any of the preceding numbered embodiments wherein the provision of the liquid feed involves a pH adjustment to obtain a pH in the range of 3-8.

Numbered embodiment 15. The method according to any of the preceding numbered embodiments wherein the provision of the liquid feed involves subjecting the whey or a product stream derived from the whey to:

removal of particles larger than 0.8 micron, and concentration.

Numbered embodiment 16. The method according to any of the preceding numbered embodiments wherein the liquid feed has a weight ratio between casein and whey protein of at most 0.20, more preferably at most 0.10, even more preferably at most 0.06 and most preferably at most 0.05.

Numbered embodiment 17. The method according to any of the preceding numbered embodiments wherein the liquid feed has a degree of BLG denaturation of at most 30%, more preferably at most 20%, even more preferably at most 15%, and most preferably at most 10%.

Numbered embodiment 18. The method according to any of the preceding numbered embodiments wherein the liquid feed has a content of total solids in the range of 0.01-50% w/w, more preferably in the range of 0.05-30% w/w, even more preferably 0.1-20% w/w, and most preferably 0.5-15% w/w.

Numbered embodiment 19. The method according to any of the preceding numbered embodiments wherein the liquid feed has a content of total solids in the range of 0.1-50% w/w, more preferably in the range of 0.5-30% w/w, even more preferably 1-20% w/w, and most preferably 4-15% w/w.

Numbered embodiment 20. The method according to any of the preceding numbered embodiments wherein the liquid feed has a content of total lipids of in the range of 0.5-9% w/w relative to total solids, more preferably in the range of 1-8% w/w, even more preferably 2-7% w/w, and most preferably 2.5-6% w/w relative to total solids.

Numbered embodiment 21. The method according to any of the preceding numbered embodiments wherein the liquid feed has a content of total protein of in the range of 12-90% w/w relative to total solids, more preferably in the range of 40-89% w/w, even more preferably 50-88% w/w, and most preferably 70-87% w/w relative to total solids.

Numbered embodiment 22. The method according to any of the preceding numbered embodiments wherein the liquid feed has a content of lactose of 0-80% w/w relative to total solids, more preferably in the range of 1-50% w/w, even more preferably 2-40% w/w, and most preferably 3-20% w/w relative to total solids.

Numbered embodiment 23. The method according to any of the preceding numbered embodiments wherein the liquid feed has a content of lactose of at most 20% w/w relative to total solids, more preferably at most 10% w/w, even more preferably at most 5% w/w, and most preferably at most 1% w/w relative to total solids.

Numbered embodiment 24. The method according to any of the preceding numbered embodiments wherein the liquid feed has a content of total TAG in the range of 0.5-6% w/w relative to total solids, more preferably in the range of 1-5% w/w, even more preferably 1.5-4.5% w/w, and most preferably 2-4% w/w relative to total solids.

Numbered embodiment 25. The method according to any of the preceding numbered embodiments wherein the liquid feed has a content of total TAG of at most 6% w/w relative to total solids, more preferably at most 5% w/w, even more preferably at most 2% w/w, and most preferably at most 1% w/w relative to total solids.

Numbered embodiment 26. The method according to any of the preceding numbered embodiments wherein the liquid feed has a content of total PL in the range of 1-6% w/w relative to total solids, more preferably in the range of 1.2-5% w/w, even more preferably 1.4-4% w/w, and most preferably 1.5-3% w/w relative to total solids.

Numbered embodiment 27. The method according to any of the preceding numbered embodiments wherein the liquid feed has an ash value in the range of 1-10% w/w relative to total solids, more preferably in the range of 1.5-8% w/w, even more preferably 1.5-7% w/w, and most preferably 2.0-6.5% w/w relative to total solids.

Numbered embodiment 28. The method according to any of the preceding numbered embodiments wherein the liquid feed has an ash value in the range of 1-6% w/w relative to total solids, more preferably in the range of 1.5-5% w/w, even more preferably 2-4% w/w, and most preferably 2.0-3.0% w/w relative to total solids Numbered embodiment 29. The method according to any of the preceding numbered embodiments wherein the liquid feed has a pH in the range of 4-8, more preferably in the range of 5-7.5, and most preferably in the range of 6-7.5.

Numbered embodiment 30. The method according to any of the preceding numbered embodiments wherein 1MF-a is operated to provide a 1MFR-a having a particle mode size of at least 200 nm, more preferably at least 205 nm, even more preferably at least 210 nm, and most preferably at least 215 nm.

Numbered embodiment 31. The method according to any of the preceding numbered embodiments wherein 1MF-a is operated to provide a 1MFR-a having a particle mode size in the range of 200-800 nm, more preferably in the range of 205-500 nm, even more preferably in the range of 210-300 nm, and most preferably in the range of 215-280 nm.

Numbered embodiment 32. The method according to any of the preceding numbered embodiments wherein 1MF-a is operated to provide a 1MFP-a having a particle mode size of at most 190 nm, more preferably at most 185 nm, even more preferably at most 180 nm, and most preferably at most 170 nm.

Numbered embodiment 33. The method according to any of the preceding numbered embodiments wherein 1MF-a is operated to provide a 1MFP-a having a particle mode size in the range of 50-190 nm, more preferably in the range of 80-185 nm, even more preferably in the range of 100-180 nm, and most preferably in the range of 120-175 nm.

Numbered embodiment 34. The method according to any of the preceding numbered embodiments wherein the membrane(s) used for 1MF-a has a nominal pore size in the range of 0.1-0.7 micron; more preferably 0.2-0.6 micron, even more preferably 0.3-0.5 micron, and most preferably 0.4-0.5 micron.

Numbered embodiment 35. The method according to any of the preceding numbered embodiments wherein the 1MF-a is implemented with diafiltration, preferably using diluent in an amount of at least 100% vol/vol relative to the volume of the liquid feed, more preferably at least 200% vol/vol, even more preferably at least 300% vol/vol, and most preferably at least 400% vol/vol.

Numbered embodiment 36. The according to any of the preceding numbered embodiments wherein 1MF-a is performed to obtain a 1MFP-a characterised by one or more of:

- 50-95% w/w of total lipids of the liquid feed have been recovered in the 1MFP-a, more preferably 55-90% w/w, even more preferred 60-85% w/w, and most preferably 65-80% w/w,
- at least 60% of the total PL of the liquid feed has been recovered in the 1MFP-a, more preferably at least 65% w/w, even more preferred at least 70% w/w, and most preferably at least 75% w/w, and/or

- at least 90% of the native BLG of the liquid feed has been recovered in the 1MFP-a, more preferably at least 95% w/w, even more preferred at least 97% w/w, and most preferably at least 98% w/w.

Numbered embodiment 37. The method according to any of the preceding numbered embodiments wherein 1MF-a is performed to obtain a 1MFP-a that has recovered at least 40% of the total cholesterol of the liquid feed, more preferably at least 60% w/w, even more preferred at least 70% w/w, and most preferably at least 75% w/w, Numbered embodiment 38. The method according to any of the preceding numbered embodiments wherein 1MF-a is performed to obtain a 1MFP-a that has recovered at most 85% of the total TAG of the liquid feed, more preferably at most 70% w/w, even more preferred at most 60% w/w, and most preferably at most 55% w/w.

Numbered embodiment 39. The method according to any of the preceding numbered embodiments wherein 2MF-a is operated to provide a 2MFR-a having a particle mode size of at least 165 nm, more preferably at least 170 nm, even more preferably at least 175 nm, and most preferably at least 180 nm.

Numbered embodiment 40. The method according to any of the preceding numbered embodiments wherein 2MF-a is operated to provide a 2MFR-a having a particle mode size in the range of 165-300 nm, more preferably in the range of 170-260 nm, even more preferably in the range of 175-230 nm, and most preferably in the range of 175-210 nm.

Numbered embodiment 41. The method according to any of the preceding numbered embodiments wherein 2MF-a is operated to provide a 2MFP-a having a particle mode size of at less than 165 nm, more preferably at most 160 nm, even more preferably at most 155 nm, and most preferably at most 150 nm.

Numbered embodiment 42. The method according to any of the preceding numbered embodiments wherein 2MF-a is operated to provide a 2MFP-a having a particle mode size in the range of 50-164 nm, more preferably in the range of 80-160 nm, even more preferably in the range of 100-155 nm, and most preferably in the range of 120-155 nm.

Numbered embodiment 43. The method according to any of the preceding numbered embodiments wherein the membrane(s) used for 2MF-a has a nominal pore size in the range of 0.02-0.4 micron; more preferably 0.05-0.3 micron, even more preferably 0.05-0.25 micron and most preferably 0.1-0.2 micron.

Numbered embodiment 44. The method according to any of the preceding numbered embodiments wherein the second microfiltration step is implemented with diafiltration, preferably using diluent in an amount of at least 50% vol/vol relative to the volume of the 1MFP-a, more preferably at least 100% vol/vol, even more preferably at least 200% vol/vol, and most preferably at least 300% vol/vol.

Numbered embodiment 45. The according to any of the preceding numbered embodiments wherein 2MF-a is performed to obtain a 2MFR-a characterised by one or more of:

- 30-99% w/w of total lipids of the 1MFP-a have been recovered in the 2MFR-a, more preferably 40-98% w/w, even more preferred 45-97% w/w, and most preferably 50-95% w/w,
- 30-99% w/w of total PL of the 1MFP-a have been recovered in the 2MFR-a, more preferably 40-98% w/w, even more preferred 45-97% w/w, and most preferably 50-95% w/w, and/or
- 0-20% of the native BLG of the 1MFP-a has been recovered in 2MFR-a, more preferably 0.5-15% w/w, even more preferred 1-10% w/w, and most preferably 2-5% w/w.

Numbered embodiment 46. The method according to any of the preceding numbered embodiments wherein 2MF-a is performed to obtain a 2MFR-a that has recovered at least 60% of the total cholesterol of the 1MFP-a, more preferably at least 80% w/w, even more preferred at least 90% w/w, and most preferably at least 95% w/w.

Numbered embodiment 47. The method according to any of the preceding numbered embodiments comprising step 4-a).

Numbered embodiment 48. The method according to any of the preceding numbered embodiments comprising step 4-a), and wherein step 4-a) involves:

concentrating the 2MFR-a
drying the 2MFR-a, or
concentrating and subsequently drying the 2MFR-a.

Numbered embodiment 49. The method according to any of the preceding numbered embodiments wherein 1MF-b is operated to provide a 1MFR-b having a particle mode size of at least 150 nm, more preferably at least 180 nm, even more preferably at least 200 nm, and most preferably at least 220 nm.

Numbered embodiment 50. The method according to any of the preceding numbered embodiments wherein 1MF-b is operated to provide a 1MFR-b having a particle mode size in the range of 150-800 nm, more preferably in the range of 180-700 nm, even more preferably in the range of 200-600 nm, and most preferably in the range of 220-500 nm.

Numbered embodiment 51. The method according to any of the preceding numbered embodiments wherein 1MF-b is operated to provide a 1MFP-b having a particle mode size of less than 200 nm, more preferably less than 180 nm, even more preferably less than 150 nm, and most preferably less than 130 nm.

Numbered embodiment 52. The method according to any of the preceding numbered embodiments wherein 1MF-b is operated to provide a 1MFP-b having a particle mode size in the range of 50-200 nm, more preferably in the range of 70-190 nm, even more preferably in the range of 90-170 nm, and most preferably in the range of 100-150 nm.

Numbered embodiment 53. The method according to any of the preceding numbered embodiments wherein the membrane(s) used for 1MF-b has a nominal pore size in the range of 0.02-0.4 micron; more preferably 0.05-0.3 micron, even more preferably 0.05-0.25 micron and most preferably 0.1-0.2 micron.

Numbered embodiment 54. The method according to any of the preceding numbered embodiments wherein the 1MF-b is implemented with diafiltration, preferably using diluent in an amount of at least 100% vol/vol relative to the volume of the liquid feed, more preferably at least 200% vol/vol, even more preferably at least 300% vol/vol, and most preferably at least 400% vol/vol.

Numbered embodiment 55. The according to any of the preceding numbered embodiments wherein 1MF-b is performed to obtain a 1MFR-b characterised by one or more of:

- 50-95% w/w of total lipids of the liquid feed have been recovered in 1MFR-b, more preferably 55-90% w/w, even more preferred 60-85% w/w, and most preferably 65-80% w/w,
- 50-95% w/w of the PL of the liquid feed have been recovered in 1MFR-b, more preferably 55-90% w/w, even more preferred 60-85% w/w, and most preferably 65-80% w/w, and/or

- 0-20% of the native BLG of the liquid feed has been recovered in 1MFR-b, more preferably 0.5-15% w/w, even more preferred 1-10% w/w, and most preferably 2-5% w/w.

Numbered embodiment 56. The method according to any of the preceding numbered embodiments wherein 1MF-b is performed to obtain a 1MFR-b that has recovered at least 50% of the total cholesterol of the liquid feed, more preferably at least 70% w/w, even more preferred at least 90% w/w, and most preferably at least 95% w/w.

Numbered embodiment 57. The method according to any of the preceding numbered embodiments wherein 1MF-b is performed to obtain a 1MFR-b that has recovered at least 50% of the total TAG of the liquid feed, more preferably at least 70% w/w, even more preferred at least 90% w/w, and most preferably at least 95% w/w.

Numbered embodiment 58. The method according to any of the preceding numbered embodiments wherein 2MF-b is operated to provide a 2MFR-b having a particle mode size of at least 200 nm, more preferably at least 205 nm, even more preferably at least 210 nm, and most preferably at least 215 nm.

Numbered embodiment 59. The method according to any of the preceding numbered embodiments wherein 2MF-b is operated to provide a 2MFR-b having a particle mode size in the range of 200-800 nm, more preferably in the range of 205-700 nm, even more preferably in the range of 210-600 nm, and most preferably in the range of 215-500 nm.

Numbered embodiment 60. The method according to any of the preceding numbered embodiments wherein 2MF-b is operated to provide a 2MFP-b having a particle mode size of at most 300 nm, more preferably at most 260 nm, even more preferably at most 230 nm, and most preferably at most 210 nm.

Numbered embodiment 61. The method according to any of the preceding numbered embodiments wherein 2MF-b is operated to provide a 2MFP-b having a particle mode size in the range of 165-300 nm, more preferably in the range of 170-260 nm, even more preferably in the range of 175-230 nm, and most preferably in the range of 175-210 nm.

Numbered embodiment 62. The method according to any of the preceding numbered embodiments wherein the membrane(s) used for 2MF-b has a nominal pore size in the range of 0.1-0.7 micron; more preferably 0.2-0.6 micron, even more preferably 0.3-0.5 micron, and most preferably 0.4-0.5 micron.

Numbered embodiment 63. The method according to any of the preceding numbered embodiments wherein 2MF-b is implemented with diafiltration, preferably using diluent in an amount of at least 50% vol/vol relative to the volume of the 1MFP-b, more preferably at least 100% vol/vol, even more preferably at least 200% vol/vol, and most preferably at least 300% vol/vol.

Numbered embodiment 64. The according to any of the preceding numbered embodiments wherein 2MF-b is performed to obtain a 2MFP-a characterised by one or more of:

- 45-85% w/w of total lipids of the 1MFR-b have been recovered in the 2MFP-b, more preferably 50-85% w/w, even more preferred 55-85% w/w, and most preferably 60-85% w/w,
- 50-90% w/w of total PL of the 1MFR-b have been recovered in the 2MFP-b, more preferably 55-90% w/w, even more preferred 60-90% w/w, and most preferably 70-90% w/w, and/or
- 80-99% w/w of the native BLG of the 1MFR-b have been recovered in the 2MFP-b, more preferably 85-99% w/w, even more preferred 90-99% w/w, and most preferably 95-99% w/w.

Numbered embodiment 65. The method according to any of the preceding numbered embodiments comprising step 4-b).

Numbered embodiment 66. The method according to any of the preceding numbered embodiments comprising step 4-b), and wherein step 4-b) involves:

- concentrating the 2MFR-b
- drying the 2MFR-b, or
- concentrating and subsequently drying the 2MFR-b.

Numbered embodiment 67. The method according to any of the preceding numbered embodiments wherein the milk lipid composition is in the form of a powder.

Numbered embodiment 68. The method according to any of the preceding numbered embodiments wherein the milk lipid composition is in the form of a liquid.

Numbered embodiment 69. A milk lipid composition, preferably derived from whey, comprising total cholesterol in an amount of 4-12% w/w relative to total lipid, and furthermore containing:

- total lipid in an amount of 10-60% w/w relative to total solids,
- phospholipids in an amount of at least 40% w/w relative to total lipids,
- preferably, a weight ratio between total cholesterol and trans-fatty acids of at least 2.0
- total protein in an amount of 30-80% w/w relative to total solids, and
- the sum of total ALA, total BLG and CMP constitutes at most 70% w/w of total protein.

Numbered embodiment 70. The milk lipid composition according to numbered embodiment 69, comprising total cholesterol in an amount of 4.5-11% w/w relative to total lipid, more preferably 5.0-10% w/w, and most preferably 5.5-8% w/w.

Numbered embodiment 71. The milk lipid composition according to numbered embodiment 69, comprising total cholesterol in an amount of 5-12% w/w relative to total lipid, more preferably 6-12% w/w, and most preferably 8-12% w/w.

Numbered embodiment 72. The milk lipid composition according to any of numbered embodiments 69-71, comprising total lipid in an amount of 10-60% w/w relative to total solids, more preferably 14-50% w/w, and most preferably 20-40% w/w.

Numbered embodiment 73. The milk lipid composition according to any of numbered embodiments 69-72, comprising phospholipid in an amount of at least 40% w/w relative to total lipids, more preferably at least 44% w/w, and most preferably in an amount of at least 46% w/w relative to total lipids.

Numbered embodiment 74. The milk lipid composition according to any of numbered embodiments 69-73, comprising phospholipid in an amount of 40-70% w/w relative to total lipids, more preferably 42-60% w/w relative to total lipids, and most preferably in an amount of 44-55% w/w relative to total lipids.

Numbered embodiment 75. The milk lipid composition according to any of numbered embodiments 69-74, comprising triacylglycerol (TAG) in an amount of at most 65% w/w relative to total lipids, more preferably at most 60% w/w, even more preferred at most 56% w/w relative to total lipids, and most preferably in an amount of at most 54% w/w relative to total lipids.

Numbered embodiment 76. The milk lipid composition according to any of numbered embodiments 69-75, comprising TAG in an amount of 30-65% w/w relative to total lipids, more preferably 40-60% w/w relative to total lipids, and most preferably in an amount of 45-56% w/w relative to total lipids.

Numbered embodiment 77. The milk lipid composition according to any of numbered embodiments 69-76, having a weight ratio between total cholesterol and trans-fatty acids of at least 2.0, more preferably at least 2.4, even more preferred at least 2.6, and most preferred at least 2.7.

Numbered embodiment 78. The milk lipid composition according to any of numbered embodiments 69-77, comprising sphingomyelin in an amount of at least 1.7% w/w relative to total solids, more preferably at least 2.0% w/w, even more preferred at least 2.4% w/w, and most preferably in an amount of at least 2.8% w/w relative to total solids.

Numbered embodiment 79. The milk lipid composition according to any of numbered embodiments 69-78, comprising sphingomyelin in an amount of at least 2.0% w/w relative to total solids, more preferably at least 2.5% w/w, even more preferred at least 2.7% w/w, and most preferably in an amount of at least 3.0% w/w relative to total solids.

Numbered embodiment 80. The milk lipid composition according to any of numbered embodiments 69-79, comprising sphingomyelin in an amount in the range of 1.7-6% w/w relative to total solids, more preferably 2.0-5.5% w/w, even more preferred 2.4-5% w/w, and most preferably in an amount of 2.8-4% w/w relative to total solids.

Numbered embodiment 81. The milk lipid composition according to any of numbered embodiments 69-80, comprising ganglioside GD3 in an amount of at least 180 mg/100 g solids, more preferably at least 200 mg/100 g solids, even more preferred at least 240 mg/100 g solids, and most preferably in an amount of at least 270 mg/100 g solids.

Numbered embodiment 82. The milk lipid composition according to any of numbered embodiments 69-81, comprising ganglioside GD3 in an amount of 180-600 mg/100 g solids, more preferably 200-500 mg/100 g solids, even more preferred 240-450 mg/100 g solids, and most preferably in an amount of 270-400 mg/100 g solids.

Numbered embodiment 83. The milk lipid composition according to any of numbered embodiments 69-82, comprising total protein in an amount of 40-75% w/w relative to total solids, more preferably 50-75% w/w, and most preferably 50-70% w/w relative to total solids.

Numbered embodiment 84. The milk lipid composition according to any of numbered embodiments 69-83, comprising total protein in an amount of 30-70% w/w relative to total solids, more preferably 35-65% w/w, and most preferably 40-60% w/w relative to total solids.

Numbered embodiment 85. The milk lipid composition according to any of numbered embodiments 69-84, comprising total protein in an amount of 40-80% w/w relative to total solids, more preferably 50-80% w/w, and most preferably 60-80% w/w relative to total solids.

Numbered embodiment 86. The milk lipid composition according to any of numbered embodiments 69-85, wherein the sum of total ALA, total BLG and CMP constitutes at most 60% w/w of total protein, more preferably at most 60% w/w, even more preferably at most 55% w/w and most preferably at most 50% w/w of total protein.

Numbered embodiment 87. The milk lipid composition according to any of numbered embodiments 69-86, wherein the content of CMP is at most 3.0% w/w of total protein, more preferably at most 2% w/w, even more preferably at most 1% w/w, and most preferably at most 0.1% w/w.

Numbered embodiment 88. The milk lipid composition according to any of numbered embodiments 69-87, wherein the content of carbohydrate relative to total solids is at most 10% w/w, more preferably at most 5% w/w, even more preferably at most 2% w/w, and most preferably at most 0.5% w/w.

Numbered embodiment 89. The milk lipid composition according to any of numbered embodiments 69-88 which is obtainable by to the method according to one or more of numbered embodiments 1-68.

Numbered embodiment 90. A nutritional composition comprising:

the milk lipid composition according to any of numbered embodiment 69-89 or obtainable according to one or more of numbered embodiments 1-68, and one or more additional food ingredients.

Numbered embodiment 91. The nutritional composition according to numbered embodiment 90 which comprises at least one components that is not derivable from whey.

Numbered embodiment 92. The nutritional composition according to any of numbered embodiment 90 or 91 wherein the nutritional composition is an infant formula, a follow-on formula, a growing up formula.

Numbered embodiment 93. The nutritional composition according to any of the numbered embodiments 90-92 comprising total cholesterol in an amount of at least 50 mg/100 g total solids, more preferably at least 80 mg/100 g total solids, even more preferred at least 100 mg/100 g total solids, and most preferably at least 150 mg/100 g total solids.

Numbered embodiment 94. The nutritional composition according to any of the numbered embodiments 90-93 comprising total cholesterol in an amount of 50-1000 mg/100 g total solids, more preferably 80-800 mg/100 g total solids, even more preferred 100-600 mg/100 g total solids, and most preferably 150-500 mg/100 g total solids.

Numbered embodiment 95. The nutritional composition according to any of the numbered embodiments 90-94 comprising total cholesterol in an amount of at least 50 mg/L, more preferably at least 80 mg/L, even more preferred at least 100 mg/L, and most preferably at least 150 mg/L.

Numbered embodiment 96. The nutritional composition according to any of the numbered embodiments 90-95 comprising total cholesterol in an amount of 50-1000 mg/L, more preferably 80-800 mg/L, even more preferred 100-600 mg/L, and most preferably 150-500 mg/L.

Numbered embodiment 97. The nutritional composition according to any of the numbered embodiments 90-96 comprising total cholesterol in an amount of 80-300 mg/100 g total solids, more preferably 100-200 mg/100 g total solids, even more preferred 120-200 mg/100 g total solids, and most preferably 130-180 mg/100 g total solids.

Numbered embodiment 98. The nutritional composition according to any of the numbered embodiments 90-97 comprising total cholesterol in an amount of 80-300 mg/L, more preferably 100-200 mg/L, even more preferred 120-200 mg/L, and most preferably 130-180 mg/L.

Numbered embodiment 99. The nutritional composition according to any of the numbered embodiments 90-98 wherein the milk lipid composition contributes with at least 20% w/w of total cholesterol of the nutritional composition, more preferably at least 40% w/w, even more preferred at least 60% w/w, and most preferred at least 80% w/w.

Numbered embodiment 100. The nutritional composition according to any of the numbered embodiments 90-99 comprising ganglioside GD3 in an amount of at least 2 mg/100 g total solids, more preferably at least 5 mg/100 g total solids, even more preferred at least 10 mg/100 g total solids, and most preferably at least 20 mg/100 g total solids.

Numbered embodiment 101. The nutritional composition according to any of the numbered embodiments 90-100 comprising ganglioside GD3 in an amount of 2-100 mg/100 g total solids, more preferably 5-80 mg/100 g total solids, even more preferred 10-50 mg/100 g total solids, and most preferably 12-30 mg/100 g total solids.

Numbered embodiment 102. The nutritional composition according to any of the numbered embodiments 90-101 comprising ganglioside GD3 in an amount of 2-50 mg/100 g total solids, more preferably 4-30 mg/100 g total solids, even more preferred 6-25 mg/100 g total solids, and most preferably 8-18 mg/100 g total solids.

Numbered embodiment 103. The nutritional composition according to any of the numbered embodiments 90-102 wherein the milk lipid composition contributes with at least 20% w/w of the ganglioside GD3 of the nutritional composition, more preferably at least 40% w/w, even more preferred at least 60% w/w, and most preferred at least 80% w/w.

Numbered embodiment 104. The nutritional composition according to any of the numbered embodiments 90-103 comprising sphingomyelin in an amount of at least 25 mg/100 g total solids, more preferably at least 50 mg/100 g total solids, even more preferred at least 100 mg/100 g total solids, and most preferably at least 140 mg/100 g total solids.

Numbered embodiment 105. The nutritional composition according to any of the numbered embodiments 90-104 comprising sphingomyelin in an amount of 25-500 mg/100 g total solids, more preferably 50-400 mg/100 g total solids, even more preferred 100-300 mg/100 g total solids, and most preferably 140-250 mg/100 g total solids.

Numbered embodiment 106. The nutritional composition according to any of the numbered embodiments 90-105 wherein the milk lipid composition contributes with at least 20% w/w of the sphingomyelin of the nutritional composition, more preferably at least 40% w/w, even more preferred at least 60% w/w, and most preferred at least 80% w/w.

Numbered embodiment 107. The nutritional composition according to any of the numbered embodiments 90-106 comprising PL in an amount of at least 50 mg/100 g total solids, more preferably at least 100 mg/100 g total solids, even more preferred at least 300 mg/100 g total solids, and most preferably at least 500 mg/100 g total solids.

Numbered embodiment 108. The nutritional composition according to any of the numbered embodiments 90-107 comprising PL in an amount of 50-2000 mg/100 g total solids, more preferably 200-2000 mg/100 g total solids, even more preferred 400-2000 mg/100 g total solids, and most preferably 600-2000 mg/100 g total solids.

Numbered embodiment 109. The nutritional composition according to any of the numbered embodiments 90-108 wherein the milk lipid composition contributes with at least 20% w/w of the PL of the nutritional composition, more preferably at least 40% w/w, even more preferred at least 60% w/w, and most preferred at least 80% w/w.

Numbered embodiment 110. The nutritional composition according to any of the numbered embodiments 90-109 comprising sialic acid in an amount of at least 100 mg/100 g total solids, more preferably at least 200 mg/100 g total solids, even more preferred at least 400 mg/100 g total solids, and most preferably at least 600 mg/100 g total solids.

Numbered embodiment 111. The nutritional composition according to any of the numbered embodiments 90-110 comprising sialic acid in an amount of 100-2000 mg/100 g total solids, more preferably 200-1800 mg/100 g total solids, even more preferred 400-1500 mg/100 g total solids, and most preferably 600-1300 mg/100 g total solids.

Numbered embodiment 112. The nutritional composition according to any of the numbered embodiments 90-111 having a weight ratio between total cholesterol and trans-fatty acids of at least 2.0, more preferably at least 2.4, even more preferred at least 2.6, and most preferred at least 2.7.

Numbered embodiment 113. The nutritional composition according to any of the numbered embodiments 90-112 comprising total solids in an amount of 5-40 g/100 g, more preferably 7-30 g/100 g, even more preferred 9-20 g/100 g, and most preferably 11-15 g/100 g.

Numbered embodiment 114. The nutritional composition according to any of the numbered embodiments 90-113 comprising total solids in an amount of 90-99 g/100 g, more preferably 91-98 g/100 g, even more preferred 92-97 g/100 g, and most preferably 93-96 g/100 g.

Numbered embodiment 115. The nutritional composition according to any of the numbered embodiments 90-114 comprising the milk lipid composition according to any of numbered embodiment 69-89 or obtainable according to one or more of numbered embodiments 1-68 in an amount of at least 0.1 g/100 g total solids, more preferably at least 0.5 g/100 g total solids, even more preferred at least 2 g/100 g total solids, and most preferably at least 3 g/100 g total solids.

Numbered embodiment 116. The nutritional composition according to any of the numbered embodiments 90-115 comprising the milk lipid composition according to any of numbered embodiment 69-89 or obtainable according to one or more of numbered embodiments 1-68 in an amount of 0.1-20 g/100 g total solids, more preferably 0.5-15 g/100 g total solids, even more preferred 2-10 g/100 g total solids, and most preferably 3-8 g/100 g total solids.

Numbered embodiment 117. A method of producing a nutritional composition comprising the steps of:

i) providing a milk lipid composition according to any of numbered embodiments 69-89 or obtainable according to one or more of numbered embodiments 1-68, ii) combining the milk lipid composition with one or more additional food ingredients and, optionally, further processing to the combination.

Numbered embodiment 118. Use of the milk lipid composition according to any of numbered embodiments 69-89 or obtainable according to one or more of numbered embodiments 1-68 in the production of a nutritional product, preferably an infant formula, and preferably using the milk lipid composition for increasing the content of one or more of:

cholesterol, phospholipid, sphingomyelin, and ganglioside, or or reducing the content of trans fatty acids, preferably relative to total cholesterol, total lipid or total phospholipid, of the nutritional composition.

The present invention has been described above with reference to specific embodiments. However, other embodiments than the above described are equally possible within the scope of the invention. The different features and steps of various embodiments and aspects of the invention may be combined in other ways than those described herein unless it is stated otherwise.

EXAMPLES

Example 1: Preparation of the Milk Lipid Composition

This example describes the production of the novel milk lipid composition using the method of the invention.

Materials and Methods:

Skim milk was concentrated to 4.5% protein and 0.08-0.11% fat by a combination of ultrafiltration and evaporation. Acid whey was produced by mineral acidification of the skim milk using HCl as described in "*Dairy Processing Handbook*", Tetra Pak, Chapter 20 pp 3-5. The majority of the minerals, NPN (non-protein-nitrogen) and lactose was removed from the thin whey by ultrafiltration to 72% protein of TS (total solids). The composition of the acid whey after ultrafiltration is found in Table 1.

TABLE 1

| Composition of acid whey after ultrafiltration | | |
|---|---|---|
| Specifications | Unit | Value |
| Total solids | % of sample | 23.3 |
| Fat | % of sample | 0.86 |
| Protein | % of sample | 16.7 |
| Lactose | % of sample | 4.3 |
| Ash | % of sample | 1.3 |
| pH | | 4.6 |

Before further processing, the acid whey was diluted from 23.3% TS to a concentration of 9% TS before pH adjustment to pH 6.5 with ⅔ NaOH (Brand) and ⅓ KOH (brand). Microfiltration was performed using TAMI 0.45 μm ISOFLUX™ 23 channel membrane at a feed pressure of 2 bar and permeate pressure of 2.25 bar. 400% diafiltration (calculated based on starting feed volume) was performed using polished water (water filtered by reverse osmosis to obtain a conductivity of at most 0.05 mS/cm) as diafiltration medium. The temperature of the feed and the retentate during the microfiltration was approximately 10° C. After the diafiltration was performed, a final concentration step of the retentate was performed to increase the TS concentration in the retentate. The composition of the permeate from the microfiltration is found in Table 2.

TABLE 2

| Composition of permeate from 0.45 μm microfiltration | | |
|---|---|---|
| Specifications | Unit | Value |
| Total solids | % of sample | 1.81 |
| Fat | % of sample | BDL |
| Protein | % of sample | 1.27 |
| Lactose | % of sample | 0.33 |
| Ash | % of sample | BDL |

The permeate from the first microfiltration was collected and used as feed for a second microfiltration performed using TAMI 0.20 μm ISOFLUX™ 23 channel membrane. The second microfiltration was performed with the same running settings as the first microfiltration, except only 300% diafiltration was performed. Also here a final concentration step was included after the diafiltration to increase the TS concentration in the retentate. The composition of the retentate from the 0.20 μm microfiltration is found in Table 3.

TABLE 3

| Composition of retentate from 0.20 μm microfiltration | | |
|---|---|---|
| Specifications | Unit | Value |
| Total solids | % of sample | 0.63 |
| Fat | % of sample | 0.19 |
| Protein | % of sample | 0.48 |
| Lactose | % of sample | BDL |
| Ash | % of sample | BDL |

The final retentate was dried by freeze drying.

Results:

The produced powder (milk lipid composition) had the composition described in Table 4.

TABLE 4

| Composition of the milk lipid composition | | |
|---|---|---|
| Specifications | Unit | Value |
| Total solids | % of sample | 97.06 |
| Total lipids | % of sample | 24.21 |
| Protein | % of sample | 66.18 |
| Lactose | % of sample | 0.23 |
| Ash | % of sample | 4.68 |
| Phospholipid | % of sample | 12.1 |

The powder had a white to yellow colour with good uniformity and was free from foreign odours and flavours.

The particle mode sizes of various process streams were measured during the experiment and were found to be:

| Process stream | Particle mode size |
|---|---|
| The liquid whey feed | Approx. 192 nm |
| Retentate after 1$^{st}$ microfiltration | Approx. 224 nm |
| Permeate after 1$^{st}$ microfiltration | Approx. 150 nm |
| Retentate after 2$^{nd}$ microfiltration (of the 1$^{st}$ MF permeate) | Approx. 181 nm |
| Permeate after 2$^{nd}$ microfiltration | Approx. 150 nm |

The "particle mode size" was measured by Nanoparticle Tracking Analysis (NTA) according to Jeppesen et al; J Extracell Vesicles. 2014 Nov. 6; 3:25011. doi: 10.3402/jev.v3.25011. More specifically the samples were diluted to appropriate concentrations in Phosphate Buffered Saline (PBS, Sigma) to obtain optimal characterization with NTA. Three individual videos of different samples were recorded for 60 s, from which size and concentration was measured using the same settings of camera level 11 and detect threshold 2. No filtration or centrifuge was applied to any of the samples.

Conclusion:

A novel milk lipid composition was produced from skim milk as starting material with a surprisingly high phospholipid concentration even though no solvent extraction was applied.

On the contrary, the present method was based on a gentle membrane fractionation and therefore provided the present milk lipid composition in a more native form than comparable prior art methods.

The inventors have seen indications that even higher phospholipid concentrations can be obtained by:

- removing even more native protein during the 2$^{nd}$ microfiltration step,
- removing even more fat during the skimming of skim milk, and/or
- reducing the level heat-denaturation of proteins during of production of the skim milk and the subsequent acid whey.

Example 2: Characterisation of the Milk Lipid Composition

This example describes the detailed characterisation of the milk lipid composition with respect to protein composition and lipid composition.

Materials and Methods:

The novel milk lipid composition produced according to Example 1 was characterised by size exclusion chromatography (SEC), reverse-phase HPLC (RP-HPLC), phospholipid class distribution and quantification, cholesterol quantification and ganglioside quantification.

For SEC analysis, the sample were solubilized in mobile phase (6 M guanidium hydrochloride pH 7.5) with the addition of 95 mM β-mercaptoethanol, to a concentration of 1 mg/mL protein and filtered through a 0.22 μm syringe filter. 50 μL sample was loaded on two TSK-GEL G3000SWXL (7.8×300 mm, P/N: 08541) columns at ambient temperature on an HPLC Pump 515 with manual seal wash (Waters) equipped with a HPLC Pump Controller Module II (Waters), an au-tosampler 717 (Waters) and a Waters 2487 Dual λ Absorbance Detector. The sample was separated at a flow rate of 0.5 mL/min with a mobile phase of 6 M guanidium hydrochloride, pH 7.5.

Proteins were detected at 280 nm and protein concentrations were calculated based on external standard curves for both alpha-lactalbumin (ALA) (Sigma-Aldrich, L6010, >85% pure) and beta-lactoglobulin (BLG) (Sigma-Aldrich, L0130, >90% pure). Concentrations for the external calibration curve and the samples are chosen, such that they are within the linear range and above the limit of quantification.

For RP-HPLC analysis, the sample were solubilized in MQ water to a concentration of 2 mg/mL protein and filtered through a 0.22 μm syringe filter. 25 μL sample was loaded on a reverse phase C4 column (Jupiter® 5 μm C4 300 Å 250 mm×4.6 mm, Phenomenex) at 40° C. on an Waters Alliance e2695 Separations Module, equipped with a Waters 2487 Dual λ Absorbance Detector. The sample was separated at a flow rate of 1 mL/min and with a gradient for elution as shown in Table 5.

TABLE 5

RP-HPLC elution gradient

| Time (min) | Buffer A: 0.1% (w/v) TFA in MQ | Buffer B: 0.1% (w/v) TFA in ACN |
|---|---|---|
| 0 | 82 | 18 |
| 30 | 55 | 45 |
| 32 | 55 | 45 |
| 32.5 | 10 | 90 |
| 37.5 | 10 | 90 |
| 38 | 82 | 18 |
| 48 | 82 | 18 |

Proteins were detected at 214 nm and protein concentrations were calculated based on external standard curves for both alpha-lactalbumin (ALA) (Sigma-Aldrich, L6010, >85% pure), beta-lactoglobulin (BLG) (Sigma-Aldrich, L0130, >90% pure) and caseino macropeptide (CMP) (internally produced standard, D430254). Concentrations for the external calibration curve and the samples are chosen, such that they are within the linear range and above the limit of quantification.

Phospholipid distribution was analysed at with quantitative 31P-NMR spectroscopy according to SAA-MET002-04.

Cholesterol quantification (total cholesterol incl. both free cholesterol and cholesterol esters) was performed by performing saponification followed by cholesterol extraction by butyl-methyl-ether and after silylation determined by GC-FID (RTU45).

Ganglioside quantification was performed according to Bertram Fong, Carmen Norris, Paul McJarrow, (2011), Liquid chromatography-high resolution electrostatic ion-trap mass spectrometric analysis of GD3 ganglioside in dairy products, International Dairy Journal 21 (2011) 42-47.

Total trans fatty acid quantification was performed by alkaline (RG) or acid (SBR) treatment followed by fat extraction by a mixture of di-ethyl ether and petroleum ether. Saponification of the fatty acids was performed by heating in a sodium hydroxide/methanol solution followed by methylation with boron trifluoride in methanol. The methyl esters were extracted by heptane and determined by GC-FID (DHF81).

Results:

The total ALA and BLG concentration (determined by SEC), native ALA, BLG and CMP concentration (determined by RP-HPLC), phospholipid concentration, cholesterol concentration, ganglioside $GD_3$ concentration and total trans fatty acid concentration can be found in Table 6.

TABLE 6

Content of selected components of the new milk lipid composition. More details are provided in Table 4.

| Specifications | Unit | Value |
|---|---|---|
| Total ALA | % of sample | 5.41 |
| Total BLG | % of sample | 25.8 |
| Native ALA | % of sample | 4.68 |
| Native BLG | % of sample | 22.40 |
| Native CMP | % of sample | 0 |
| Total phospholipid | % of sample | 12 |
| Phosphatidyl choline | % of sample | 2.8 |
| 2-lysophosphatidyl choline | % of sample | 0.04 |
| Phosphatidyl inositol | % of sample | 0.64 |
| Phosphatidyl serine | % of sample | 1.09 |
| Sphingomyelin | % of sample | 2.87 |
| Phosphatidyl ethanolamine | % of sample | 3.12 |

TABLE 6-continued

Content of selected components of the new milk lipid composition. More details are provided in Table 4.

| Specifications | Unit | Value |
|---|---|---|
| Lysophosphatidyl ethanolamine | % of sample | 0.05 |
| Cholesterol | % of sample | 1.43 |
| Ganglioside $GD_3$ | mg/kg | 2942 |
| Total trans fatty acid | % of sample | 0.52 |

The difference between the total ALA concentration and native ALA concentration gives the amount of aggregated ALA, and similar the difference between the total BLG concentration and native BLG concentration gives the amount of aggregated BLG. The amount of aggregated ALA and BLG in the sample were surprisingly low at 0.7% of the sample and 3.4% of the sample, respectively.

Conclusion:

The novel milk lipid composition produced according to example 2 had a surprisingly high content of phospholipids, cholesterol and ganglioside $GD_3$. Additionally, the content of aggregated whey proteins (specifically ALA and BLG) and trans fatty acids were surprisingly low.

Example 3: Humanized Infant Formulas Containing the New Milk Lipid Composition This example describes:

the production of infant formulas containing the novel milk lipid composition.

benefits relative to prior art milk lipid composition

The milk lipid composition can be used as rich source of cholesterol, gangliosides, and sphingomyelin due to its high content of cholesterol, gangliosides and phospholipids (including sphingomyelin) while low levels of trans fatty acids and reduced levels of whey proteins (e.g. by absence of CGMP). This allows for formulation of an infant formula with humanized levels of cholesterol, gangliosides and sphingomyelin without simultaneous elevation of trans fatty acids and whey proteins provided in the milk lipid composition ingredient. All formulations complies with the EU legislation on compositional requirements for infant formulas, if not otherwise stated.

Materials and Methods:

Three powdered infant formula (IF) are prepared by mixing the ingredients described in Table 7. Infant formula 1) (IF1) is the reference IF and contains Lacprodan® MFGM-10 as main phospholipid/cholesterol source. 4.7% of the total dry-matter of (IF1) originates from Lac-prodan® MFGM-10. IF2 and IF3 are nutritional compositions according to the invention and contain the novel milk lipid composition (NML) prepared in Example 1 as main phospholipid/cholesterol source. IF2 contains the novel milk lipid ingredient in the same dosage Lacprodan® MFGM-10 was used in IF1. IF3 contains the novel milk lipid composition in an amount to provide the same total phospholipid contribution as Lacprodan® MFGM-10 did in IF1.

The contents of selected nutrients of the powdered infant formula are shown in Table 8. The contents of selected nutrients of ready-to-feed infant formula based on the powders of Table 7 are shown in Table 9.

TABLE 7

Infant formulas (IF2 and IF3) comprising the novel milk lipid composition (NML) compared to infant formula (IF1) comprising the commercial ingredient Lacprodan ® MFGM-10

| Dosage of ingredients in infant formula (%) | IF1: MFGM-10 | IF2: NML 4.7% | IF3: NML 2.77% |
|---|---|---|---|
| Oil | 25.06 | 24.8 | 25.12 |
| Lactose | 55.25 | 55.09 | 55.24 |
| SMP | 12.03 | 12.08 | 11.97 |
| WPC80 | 2.96 | 3.33 | 4.89 |
| MFGM-10 | 4.7 | | |
| Novel milk lipid composition | 0 | 4.7 | 2.77 |

IF = infant formula;
SMP = skimmed milk powder;
WPC80 = whey protein concentrate containing 80% w/w protein;
MFGM-10 = Lacprodan ® MFGM-10

TABLE 8

Nutrient content of the powdered infant formulas of Table 7.

| Nutrient content (of 100 g IF powder) | IF1: MFGM-10 | IF2: NML 4.7% | IF3: NML 2.77% |
|---|---|---|---|
| Tot Phospholipids (mg) | 378.1 | 618.7 | 408.5 |
| PC (mg) | 84.9 | 147.78 | 87.09 |
| PE (mg) | 91.3 | 162.61 | 95.84 |
| PI (mg) | 23.9 | 30.22 | 17.81 |
| PS (mg) | 29.6 | 53.29 | 31.41 |
| SM (mg) | 100.1 | 162.02 | 108.95 |
| GA (mg) | 8.00 | 13.83 | 8.15 |
| Cholesterol (mg) | 32.71 | 68.15 | 40.5 |
| Saturates (g) | 12.89 | 12.86 | 12.76 |
| Monounsaturates (g) | 9.49 | 9.46 | 9.46 |
| Polyunsaturates (g) | 2.39 | 2.39 | 2.38 |
| Trans fat (% of total fat) | 0.068 | 0.093 | 0.055 |

TABLE 9

Nutrient content of ready-to-feed infant formula infants (per 1000 mL liquid IF) based on the powder formulas of Table 7; 129 g powder dissolved in water to reach a liquid volume of 1000 mL. Different variants are depicted: 1) Levels in an IF formulated with the use of Lacprodan ® MFGM-10 (with 4.7% of the total DM originating from Lacprodan © MFGM-10), 2) Levels in an IF with the formulation of the novel milk lipid ingredient where usage is the same DM content as depicted for Lacprodan ® MFGM-10, 3) Levels in an IF with formulation of the novel milk lipid ingredient where usage is normalized to that of the phospholipid contribution from Lacprodan ® MFGM-10. As WPC80 also contributes to the phospholipid content, and is differently dosed in A) and C), the phospholipid content in the two IF is not identical.

| Nutrient content (of 1 L IF) | 1) MFGM-10 | 2) NML 4.7% | 3) NML 2.77% |
|---|---|---|---|
| Phospholipids (mg) | 487.7 | 798.1 | 527 |
| PC (mg) | 109.6 | 190.6 | 112.4 |
| PE (mg) | 117.8 | 209.8 | 123.6 |
| PI (mg) | 30.8 | 39 | 23 |
| PS (mg) | 38.2 | 68.7 | 40.5 |
| SM (mg) | 129.2 | 209 | 140.5 |
| GA - GD3 (mg) | 10.32 | 17.84 | 10.51 |
| Cholesterol (mg) | 42.2 | 87.9 | 52.3 |
| Saturates (g) | 16.62 | 16.6 | 16.5 |
| Monounsaturates (g) | 12.24 | 12.2 | 12.2 |
| Polyunsaturates (g) | 3.08 | 3.1 | 3.1 |

Results and Discussion:

Human milk cholesterol levels ranges from 9.7-20.0 mg/100 mL (Refs. 1 and 2) whereas bovine infant formula cholesterol levels ranges from 1.5-5.1 mg/100 mL (Ref. 3). Of these, infant formulas without addition of bovine Milk Fat Globule Membrane (MFGM) ranges from 1.5-2.6 (Ref. 3). Addition of the novel milk lipid composition allows for cholesterol elevation up to 8.8 mg/100 mL. This level is above what can be reached by formulation using the same dry-matter of e.g. cholesterol-rich commercial ingredients such as Lacprodan® MFGM-10 (see Table 9).

Addition of animal cholesterol may also be provided by other dairy sources such as cream or anhydrous milk fat (AMF) (see Table 10).

TABLE 10

Content of total cholesterol and trans fatty acids in different dairy ingredients including the novel milk lipid composition.

| | Cholesterol g/100 g sample | Trans FA g/100 g sample | Cholesterol:Trans FA ratio |
|---|---|---|---|
| Cream powder | 0.10 | 1.63 | 0.06 |
| AMF | 0.15 | 3.04 | 0.05 |
| Lacprodan ® MFGM-10 | 0.76 | 0.30 | 2.50 |
| Lacprodan ® PL-20*) | 0.21 | 0.47 | 0.44 |
| Novel milk lipid composition of Example 1 | 1.43 | 0.52 | 2.75 |

*)Lacprodan ® PL-20 is a milk phospholipid product prepared from butter serum from butter oil production.

TABLE 11

Needed dosage of different milk lipid compositions to reach human milk cholesterol levels (9 mg/100 mL) including the trans-fat contribution from each ingredient in the final formula. The needed dosage for cream and AMF will violate the EU legislation on infant formula requirements.

| | MFGM-10 | Novel milk lipid ingredient | Cream powder | AMF |
|---|---|---|---|---|
| Cholesterol (mg/100 g powder) | 678.1 | 1432 | 221.1 | 146.8 |
| Dosage (g/100 g) to reach 9 mg/100 mL cholesterol in model IF | 10.2 | 4.8 | 31.0 | 48 |
| Trans fatty acids (% of total fat) | 0.14 | 0.09 | 3.88 | 3.04 |

However, the addition of cholesterol from these sources simultaneously increases the content of trans fatty acids, which is higher in bovine milk fat than in human milk fat. The content of trans fatty acids in infant formulas is restricted to a maximum of 3% of total fatty acids (EU Regulation EC 127/2016). Trans fatty acid consumption in infant is restricted due to the hazardous health risks related to increased risks of coronary heart disease and type 2 diabetes upon consumption of trans fatty acids. Usage of the novel milk lipid composition therefore enables the increase of cholesterol in an infant formula without concomitant increase in trans fatty acid content.

Formulations were also performed to reach a cholesterol level at 9 mg/100 mL in a model infant formula (see Table 11 and Table 12). This concentration is within the range of human milk.

TABLE 12

Exemplified formulation and nutrient content in a model infant formula to reach human milk cholesterol levels. The cholesterol contribution from SMP (7 mg/100 g powder) has been included in the calculations. It was not possible to formulate with AMF due to legal limitations in the formulation software. Values in bold are violating the EU regulation.

| | MFGM-10 | NML 4.8 | Cream powder |
|---|---|---|---|
| Dosage of ingredients in infant formula powder(%) | | | |
| Oil (palm oil) | 24.62 | 24.78 | 0 |
| lactose | 49.74 | 55.08 | 52.27 |
| SMP | 15.48 | 12.08 | 9 |
| WPC80 | 0 | 3.23 | 7.78 |
| MFGM-10 | 10.16 | | |
| Novel milk lipid composition | | 4.83 | |
| Cream powder product | | | 30.95 |
| Whey protein:casein weight ratio | 65:35 | 65:35 | 65:35 |
| Protein (g/100 kcal) | **2.5** | 1.96 | 2.01 |
| Protein (g/100 g IF) | 12.75 | 9.97 | 10.4 |
| Energy: | 510 | 510 | 520 |
| Nutrient content (of 100 g IF powder) | | | |
| Tot Phospholipids (mg) | 721.6 | 632.8 | 238.0 |
| 1PC (mg) | 183.7 | 151.8 | 34.0 |
| PE (mg) | 197.4 | 167.1 | 34.0 |
| PI (mg) | 51.6 | 31.0 | 8.7 |
| PS (mg) | 64.0 | 54.8 | 14.9 |
| SM (mg) | 187.1 | 165.6 | 67.7 |
| Cholesterol (mg) | 70.0 | 70.0 | 69.1 |
| Saturates (g) | 13.3 | 12.9 | 16.2 |
| Monounsaturates (g) | 9.6 | 9.5 | 5.9 |
| Polyunsaturates (g) | 2.4 | 2.4 | 0.7 |
| Trans fatty acids (% of total fat) | 0.14 | 0.09 | **3.88** |
| Trans fatty acids/cholesterol % | 0.205 | 0.137 | 5.619 |
| Nutrient content (of 1 L IF) | | | |
| Phospholipids (mg) | 930.8 | 816.3 | 307.0 |
| PC (mg) | 236.9 | 195.9 | 43.9 |
| PE (mg) | 254.7 | 215.5 | 43.9 |
| PI (mg) | 66.6 | 40.1 | 11.2 |
| PS (mg) | 82.5 | 70.6 | 19.2 |
| SM (mg) | 241.4 | 213.6 | 87.4 |
| Cholesterol (mg) | 90.3 | 90.3 | 89.1 |
| Saturates (g) | 17.1 | 16.6 | 20.8 |
| Monounsaturates (g) | 12.3 | 12.2 | 7.5 |
| Polyunsaturates (g) | 3.1 | 3.1 | 0.9 |

Humanized cholesterol levels are possible to reach with Lacprodan® MFGM-10 and the new milk lipid formulation. However, the needed Lacprodan®MFGM-10 dosage results in a high protein content in the model infant formula (2.5 g/100 kcal) reaching the maximum legal limit for infant formulas. Therefore it is not possible to supplement the MFGM-10 based IF variant with additional functional proteins for improved infant development as such a supplementation would make the protein content exceed the maximum legal limit (2.5 g protein/100 kcal). The NML-variant, however, still has room for additional functional protein.

Using cream powder to obtain human milk cholesterol levels will violate the EU legislation for infant formula on the content of trans fatty acids. Also, the needed cream dosage will make up the total legal fat content and source in the IF. This is problematic as the EU legal content of essential fatty acids, in particular linoleic acid (C18:2 and C18:3) is nearly impossible to reach with only animal fat, as they primarily are derived from vegetable oils.

Applying AMF, consisting of 99% fat, as cholesterol source to reach human milk levels will exceed the EU legislation on fat and energy content in an IF (Maximum 31 g fat/100 g IF powder). Therefore, it is not possible to legally apply cream or AMF to obtain humanized cholesterol levels in infant formulas.

Breastfeeding of infants is associated with lower blood cholesterol later in life (Ref. 4) and it has been argued that higher cholesterol and LDL-cholesterol levels in infancy is required for optimal cognitive development and programming of lipid metabolism later in life (Ref. 6). Taken together, it is desirable to increase cholesterol in infant formulas without concomitant increase in trans fatty acid levels.

Human milk ganglioside GD3 ranges from 20.3 mg/L in colostrum to 2.8 mg/L in 12-month mature milk (Ref. 10), whereas bovine infant formula ganglioside levels ranges from 0.27 to 6.0 mg/L with GD3 being the main ganglioside (Ref. 9). Addition of the novel milk lipid composition into an infant formula allows for elevation of GD3 levels up to 17.8 mg/L (see Table 9), which is similar to high levels found in human milk.

Breastfeeding of infants is associated with improved cognitive development as compared to infant-formula fed infant. This difference has in part been explained by the levels of dietary gangliosides provided in human breast milk that are less predominant in bovine infant formulas (Ref. 8). Gangliosides are considered to positively impact cognitive functions, particularly in the early postnatal period when the brain is still growing. Inclusion of the novel milk lipid composition in an infant formula allows for elevation of gangliosides up to 17.8 mg/L.

Dietary sphingomyelin is a phospholipid species of high importance to myelination of the infant developing brain and cognitive development. Sphingomyelin (SM) is one of the most predominant phospholipid species with levels ranging between 8.2-16.5 mg/100 mL in human breast milk (Ref. 7). In bovine infant formulas, the most abundant phospholipid species is phosphatidylethanolamine (PE) followed by SM. Levels of SM ranges from 6.01-9.9 mg/100 mL in infant formulas without addition of a cholesterol-containing ingredient (MFGM), and between 12.5-13.7 mg/100 mL with addition of MFGM (Ref. 7). Addition of the novel milk composition enables SM enrichment of up to 20.9 mg/100 mL when using same DM content as a known cholesterol-containing ingredient.

Conclusion:

Taken together, the present invention relates to a nutritional composition for infants and/or toddler comprising a milk lipid composition that increases levels of cholesterol, gangliosides, and sphingomyelin without simultaneous increased addition of whey proteins and trans fatty acids. The use of the milk lipid composition in nutritional solutions for infants and/or toddlers represents a step for humanizing infant formulas with respect to components implicated in improved cognitive development and metabolic programming, thus bringing the composition of infant formulas closer to the composition and benefits of human breast milk.

Example 4: Impact of Partial Replacement of Vegetable Oil with Cream Powder

In order to investigate the impact of modifying a vegetable oil-based IF by partial replacement of the vegetable oil with milk fat such as e.g. cream powder, four powder formulations of IF (IF4-7) have been investigated.

The four IFs can be prepared by mixing the ingredients described in Table 13. IF4 and IF5 contain the novel milk lipid composition (NML) prepared in Example 1 and WPC80, and IF5 additionally contains cream powder that has partially replaced some of the vegetable oil of IF4. IF6 and IF7 are similar to IF4 and IF5 with the exception that the NML has been replaced with additional WPC80.

The contents of selected nutrients of the powdered infant formula are also shown in Table 13 (based on calculations of the nutrient composition of the ingredients).

TABLE 13

Formulations and nutrient contents of 4 model infant formulas illustrating the impact of increasing the cholesterol content of an infant formula by partial replacement of vegetable oil with fat from cream powder and the impact of partially replacing a standard whey protein concentrate containing 80% whey protein (WPC80) with the milk lipid composition according to the invention. IF6 and IF7 contain WPC80 but not the novel milk lipid composition (NML) obtained from Example 1 whereas IF4 and IF5 contain both NML and WPC80.

| | IF4 | IF5 | IF6 | IF7 |
|---|---|---|---|---|
| Dosage of ingredients (% w/w) | | | | |
| Vegetable oil (palm oil) | 24.8 | 13.2 | 25.6 | 14.0 |
| Lactose | 54.8 | 55.1 | 53.5 | 53.5 |
| Skim milk powder | 12.2 | 10.6 | 13.0 | 11.5 |
| WPC80 | 3.4 | 3.3 | 7.9 | 7.9 |
| NML from Example 1 | **4.7** | **4.7** | | |
| Cream powder (Isigny) | | **13** | | **13.1** |
| Whey protein:casein ratio | 65:35 | 65:35 | 65:35 | 65:35 |
| Protein (g/100 kcal) | 1.98 | 1.95 | 2.1 | 2.1 |
| Protein (g/100 g infant formula powder) | 10.10 | 9.97 | 10.71 | 10.71 |
| Energy (kcal/100 g): | 510 | 510 | 510 | 510 |
| Nutrient content (per 100 g IF powder) | | | | |
| Total Phospholipids (mg) | 618.7 | 669.7 | 118.4 | 169.6 |
| PC (mg) | 147.8 | 162.1 | N.D. | 14.4 |
| PE (mg) | 162.6 | 176.9 | N.D. | 14.4 |
| PI (mg) | 30.2 | 33.9 | N.D. | 3.7 |
| PS (mg) | 53.3 | 59.5 | N.D. | 6.3 |
| SM (mg) | 162.0 | 175.4 | 36.3 | 49.8 |
| Cholesterol (mg) | **74.0** | 102.7 | **14.8** | 43.7 |
| Saturates (g) | 12.2 | 13.9 | 12.6 | 13.7 |
| Monounsaturates (g) | 9.5 | 7.6 | 9.5 | 7.7 |
| Polyunsaturates (g) | 2.4 | 1.6 | 2.4 | 1.6 |
| Trans fatty acid (g) | 0.024 | 0.5 | N.D. | 0.47 |
| Cholesterol:trans fatty acid weight ratio | **2.8** | 0.2 | N.D. | 0.1 |
| Nutrient content (per 1 L IF) | | | | |
| Phospholipids (mg) | 800.1 | 863.9 | 152.7 | 218.8 |
| PC (mg) | 190.6 | 209.1 | N.D. | N.D. |
| PE (mg) | 209.8 | 228.2 | N.D. | N.D. |
| PI (mg) | 39.0 | 43.7 | N.D. | N.D. |
| PS (mg) | 68.7 | 76.8 | N.D. | N.D. |
| SM (mg) | 209.6 | 226.3 | 46.8 | 64.2 |
| Cholesterol (mg) | 95.5 | 132.5 | 19.1 | 56.3 |
| Saturates (g) | 16.6 | 18.0 | 16.3 | 17.7 |
| Monounsaturates (g) | 12.2 | 9.8 | 12.2 | 9.9 |
| Polyunsaturates (g) | 3.1 | 2.0 | 3.1 | 2.0 |

N.D. = not determined.

The inventors have furthermore estimated that if the butter serum product of JPH 0 530903 A (sample B of Table 1 of JPH 0 530903 A) had been used instead of the NML in IF4a weight ratio between total cholesterol and trans-fatty acids of only approx. 0.5 would have been obtained.

Conclusion:

This example illustrates that while even partial replacement of vegetable oil with cream powder results in an increased content of cholesterol in an infant formula powder the contents of trans fatty acids are also inherently increased as the trans fatty acids form part of cream and other lipid fractions derived from cream or side streams from phase inversion of cream. This is e.g. exemplified in Table 10 of Example 3 where Lacprodan® PL-20, a product derived from butter serum, is shown to have cholesterol:trans-fatty acid ratio of only 0.44).

SELECTED REFERENCES (1) Clark, R. M.; Fey, M. B.; Jensen, R. G.; Hill, D. W. Desmosterol in human milk. Lipids 1983, 18, 264-266

(2) Jensen, R. G. The lipids in human milk. Prog. Lipid Res. 1996, 35, 53-92.), (3) Claumarchirant et al; J. Agric. Food Chem. 2015, 63, 32, 7245-7251; DOI: 10.1021/acs.jafc.5b02647

(4) Owen, C. G.; Whincup, P. H.; Kaye, S. J.; Martin, R. M.; Smith, G. D.; Cook, D. G.; Bergstrom, E.; Black, S.; Wadsworth, M. E.; Fall, C. H.; Freudenheim, J. L.; Nie, J.; Huxley, R. R.; Kolacek, S.; Leeson, FIG. 2. Average intakes of cholesterol (a), animal sterol (b), plant sterol (c) and total sterol (d). Different super-script letters denote significant differences ($p<0.001$) between lactation stages. Tukey's HSD test. Journal of Agricultural and Food Chemistry, DOI: 10.1021/acs.jafc.5b02647, J. Agric. Food Chem. 2015, 63, 7245-7251 7250

(5) C. P.; Pearce, M. S.; Raitakari, O. T.; Lisinen, I.; Viikari, J. S.; Ravelli, A. C.; Rudnicka, A. R.; Strachan, D. P.; Williams, S. M. Does initial breastfeeding lead to lower blood cholesterol in adult life? A quantitative review of the evidence. Am. J. Clin. Nutr. 2008, 88, 305-14

(6) Harit, D.; Faridi, M. M. A.; Aggarwal, A.; Sharma, S. B. Lipid profile of term infants on exclusive breastfeeding and mixed feeding: a comparative study. Eur. J. Clin. Nutr. 2008, 62, 203-209.

(7) Claumarchirant L; et al Int Dairy J 2016, http://dx-.doi.org/10.1016/j.id-airyj.2016.06.005

(8) Gurnida et al. 2012, doi:10.1016/j.earlhum-dev.2012.01.003

(9) Lacomba et al. 2011, Doi:10.1016/j.idairyj.2011.05.008International Dairy Journal 21 (2011) 887-895

(10) Ma et al. 2015, https://doi.org/10.1016/j.id-airyj.2015.05.006

The invention claimed is:

1. A milk lipid composition, derived from whey, comprising total cholesterol in an amount of 4-12% w/w relative to total lipid, and:

the total lipid in an amount of 10-60% w/w relative to total solids;

phospholipids in an amount of at least 40% w/w relative to the total lipid;

a weight ratio between the total cholesterol and trans-fatty acids of at least 2.0;

total protein in an amount of 30-80% w/w relative to the total solids; and a sum of total alpha-lactalbumin (ALA), total beta-lactoglobulin (BLG), and caseino macropeptide (CMP) constitutes at most 70% w/w of the total protein.

2. The milk lipid composition of claim 1, having a weight ratio between the total cholesterol and the trans-fatty acids of at least 2.2, at least 2.4, at least 2.6, or at least 2.7.

3. A nutritional composition comprising:

the milk lipid composition of claim 1, the milk lipid composition contributing with at least 20% w/w of the total cholesterol of the nutritional composition; and one or more additional food ingredients; and the total cholesterol in an amount of at least 10 mg/100 g the total solids, at least 50 mg/100 g the total solids, at least 80 mg/100 g the total solids, at least 100 mg/100 g the total solids, or at least 150 mg/100 g the total solids;

wherein the nutritional composition has a weight ratio between the total cholesterol and the trans-fatty acids of at least 2.0.

4. The nutritional composition of claim 3, comprising at least one component that is not derivable from whey.

5. The nutritional composition of claim 3, wherein the nutritional composition comprises the total cholesterol in an amount of 10-1000 mg/100 g the total solids, 50-800 mg/100 g the total solids, 80-800 mg/100 g the total solids, 100-600 mg/100 g the total solids, or 150-500 mg/100 g the total solids.

6. The nutritional composition of claim 3, wherein the nutritional composition is an infant formula, a follow-on formula, or a growing up formula.

7. The nutritional composition of claim 3, wherein the milk lipid composition contributes with at least 40% w/w of the total cholesterol of the nutritional composition, at least 60% w/w, or at least 80% w/w.

8. The nutritional composition claim 3, having a weight ratio between the total cholesterol and the trans-fatty acids of at least 2.2, at least 2.4, at least 2.6, or at least 2.7.

9. A method of making a nutritional product, wherein the nutritional product comprises the milk lipid composition of claim 1;

wherein the nutritional product is an infant formula; and wherein the method comprises increasing content of one or more of:

cholesterol, the phospholipids, sphingomyelin, and ganglioside of the nutritional composition; or wherein the method comprises reducing the content of the trans-fatty acids relative to the total cholesterol, the total lipid, or total phospholipid of the nutritional composition.

* * * * *